United States Patent [19]

Mashiko et al.

[11] Patent Number: 4,942,422
[45] Date of Patent: Jul. 17, 1990

[54] IMAGE REPRODUCING DEVICE AND TRANSFER SHEET USED IN THE DEVICE

[75] Inventors: Harumitsu Mashiko; Shigeru Suzuki, both of Yokohama; Takashi Seto, Ayase, all of Japan

[73] Assignee: Ricoh Company, Ltd., Tokyo, Japan

[21] Appl. No.: 196,604

[22] Filed: May 20, 1988

[30] Foreign Application Priority Data

| May 22, 1987 | [JP] | Japan | 62-124008 |
| May 29, 1987 | [JP] | Japan | 62-133941 |
| Jun. 5, 1987 | [JP] | Japan | 62-139960 |
| Jul. 10, 1987 | [JP] | Japan | 62-171272 |

[51] Int. Cl.⁵ ............................................. G03B 29/00
[52] U.S. Cl. .................................... 355/28; 355/29; 355/30; 355/72; 355/100; 355/106; 354/86
[58] Field of Search ................ 355/27, 28, 100, 106, 355/30, 72, 234, 29; 354/84, 85, 86

[56] References Cited

U.S. PATENT DOCUMENTS

| Re. 28,828 | 5/1976 | Komori et al. | 355/234 |
| 1,561,945 | 11/1925 | Penin | 352/78 R |
| 2,106,374 | 1/1938 | Goldhammer et al. | 352/78 R |
| 4,147,427 | 4/1979 | Stewart | 355/72 |
| 4,332,456 | 6/1982 | Kaufmann | 355/27 |
| 4,565,440 | 1/1986 | Bloechl et al. | 355/27 |
| 4,745,442 | 5/1988 | Oshikoshi et al. | 355/28 |

Primary Examiner—Monroe H. Hayes
Attorney, Agent, or Firm—Oblon, Spivak, McClelland, Maier & Neustadt

[57] ABSTRACT

A device for reproducing an image of an original by using photosensitive material and transfer material for receiving an image formed on the photosensitive material. The original is optionally scanned to produce an optical signal which represents an image of the original, and the photosensitive material is exposed in accordance with the optical signal from the scanner together with the movement of the photosensitive material in synchronization with the scanning. A developer device superposes the exposed photosensitive material on the transfer material and spreads a developer between the superposed photosensitive material and transfer material so as to reproduce the image on the transfer material.

49 Claims, 15 Drawing Sheets

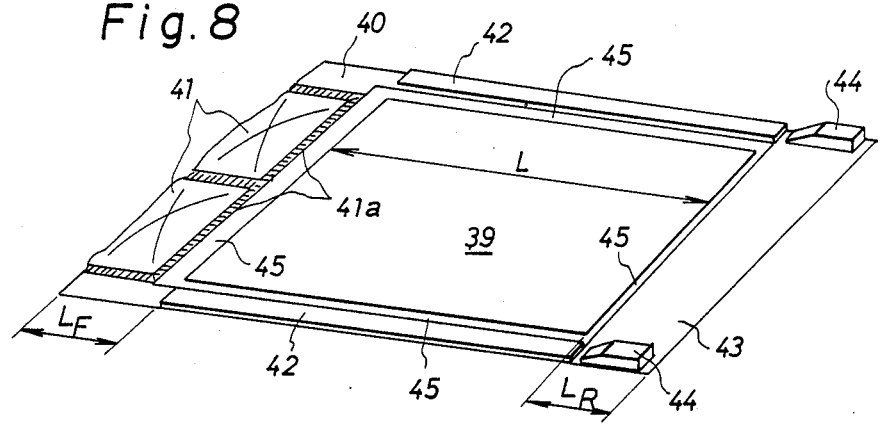
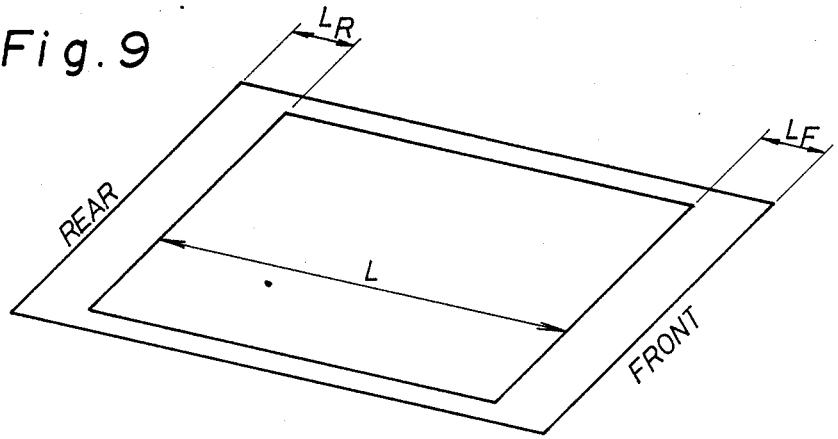
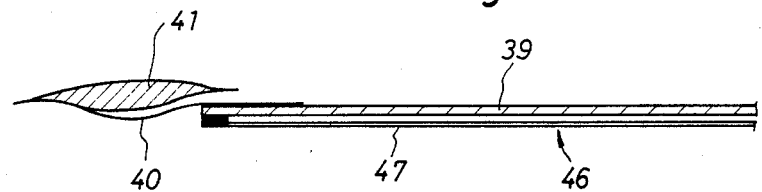
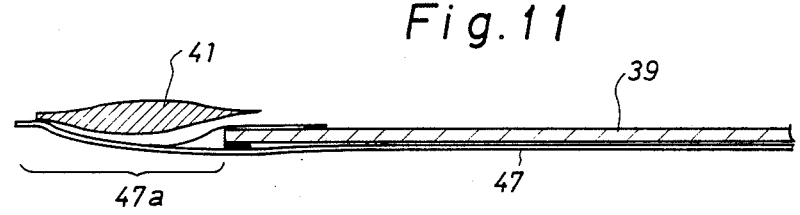

Fig. 16

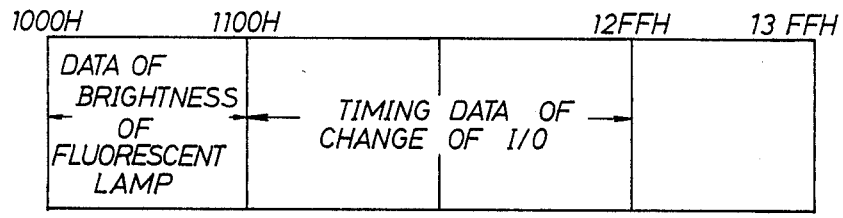

| 1000H | 1100H | 12FFH | 13 FFH |

DATA OF BRIGHTNESS OF FLUORESCENT LAMP | TIMING DATA OF CHANGE OF I/O | |

Fig. 17

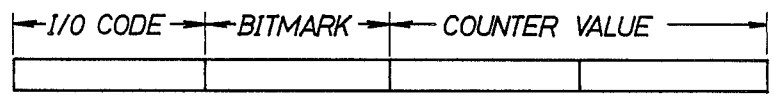

|←I/O CODE→|←BITMARK→|←COUNTER VALUE→|

Fig. 18

| I/O CODE | CONTENTS | | BIT MARK |
|---|---|---|---|
| 01H | POSITIVE EDGE OF SIGNAL | SCANNER DRIVE | 0 0 0 0 0 0 0 1 |
| | | | 0 0 0 0 0 0 1 0 |
| | | SENSOR 22 OUTPUT | 0 0 0 0 0 1 0 0 |
| | | SENSOR 27 OUTPUT | 0 0 0 0 1 0 0 0 |
| | | CUTTER DRIVE | 0 0 0 1 0 0 0 0 |
| | | SENSOR 31 OUTPUT | 0 0 1 0 0 0 0 0 |
| | | SENSOR 34 OUTPUT | 0 1 0 0 0 0 0 0 |
| | | | 1 0 0 0 0 0 0 0 |
| 02H | NEGATIVE EDGE OF SIGNAL | SCANNER DRIVE | 0 0 0 0 0 0 0 1 |
| | | | 0 0 0 0 0 0 1 0 |
| | | SENSOR 22 OUTPUT | 0 0 0 0 0 1 0 0 |
| | | SENSOR 27 OUTPUT | 0 0 0 0 1 0 0 0 |
| | | CUTTER DRIVE | 0 0 0 1 0 0 0 0 |
| | | SENSOR 31 OUTPUT | 0 0 1 0 0 0 0 0 |
| | | SENSOR 34 OUTPUT | 0 1 0 0 0 0 0 0 |
| | | | 1 0 0 0 0 0 0 0 |

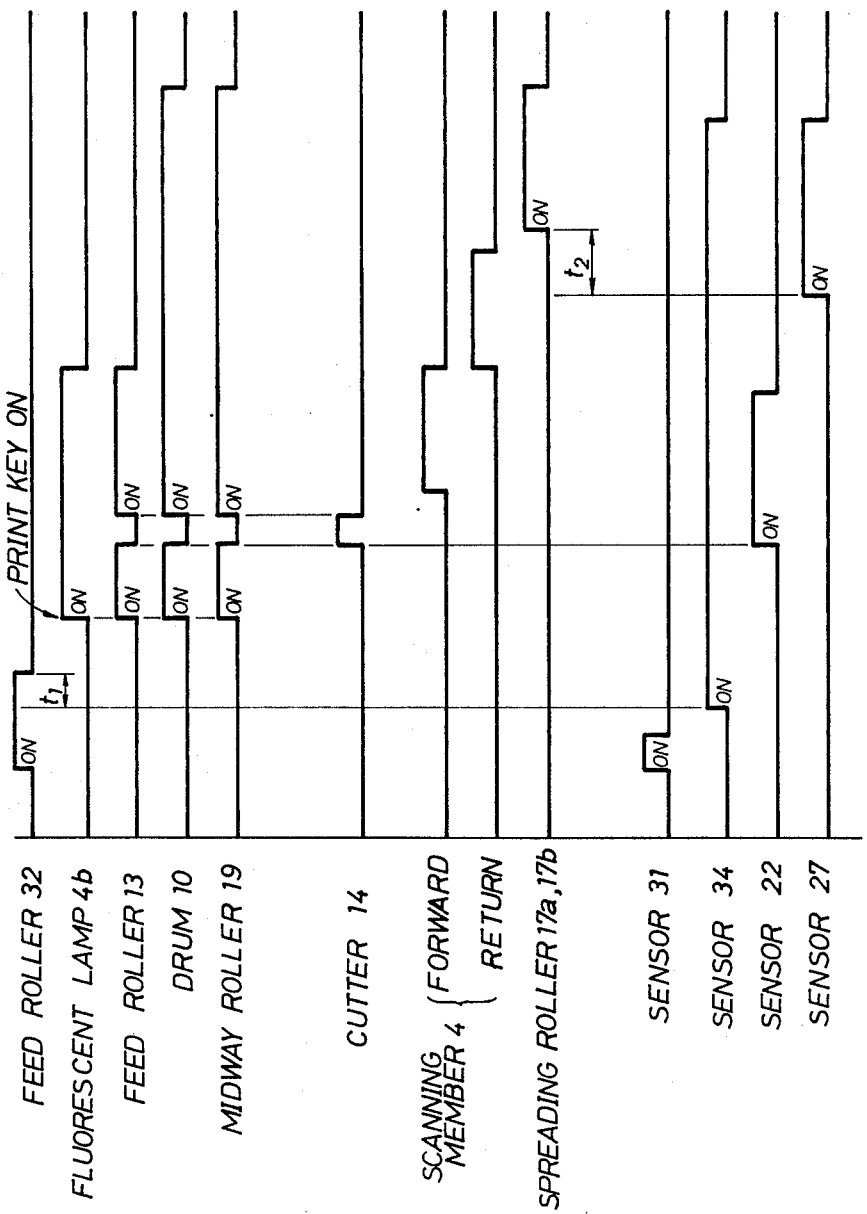

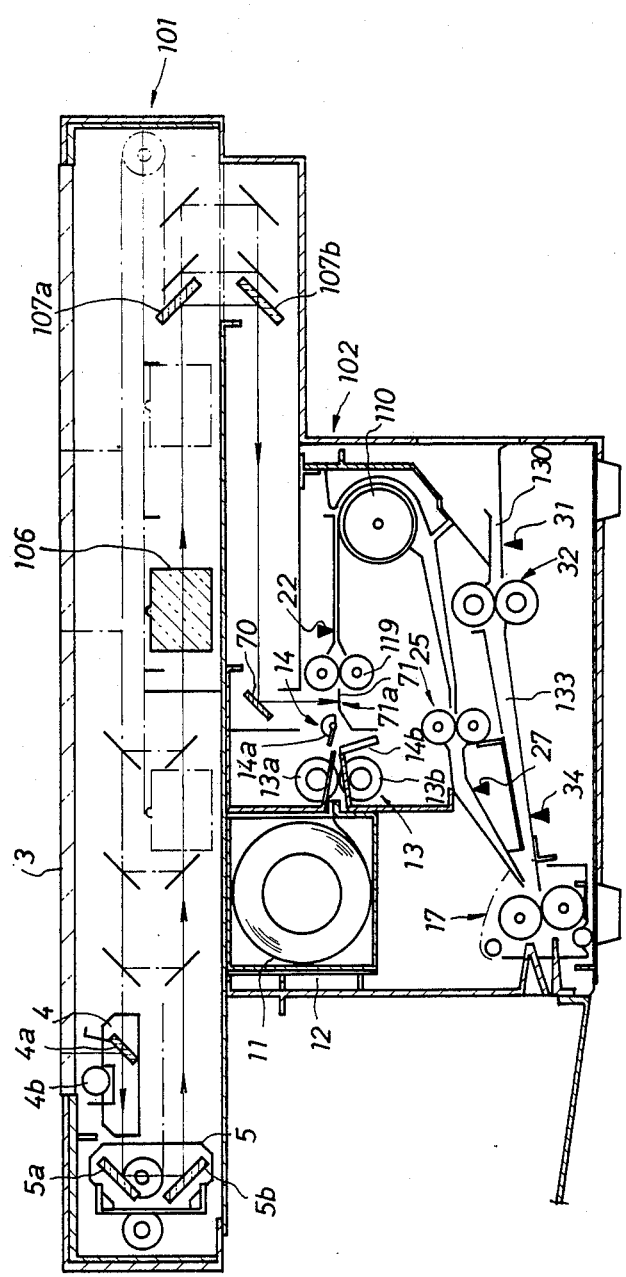

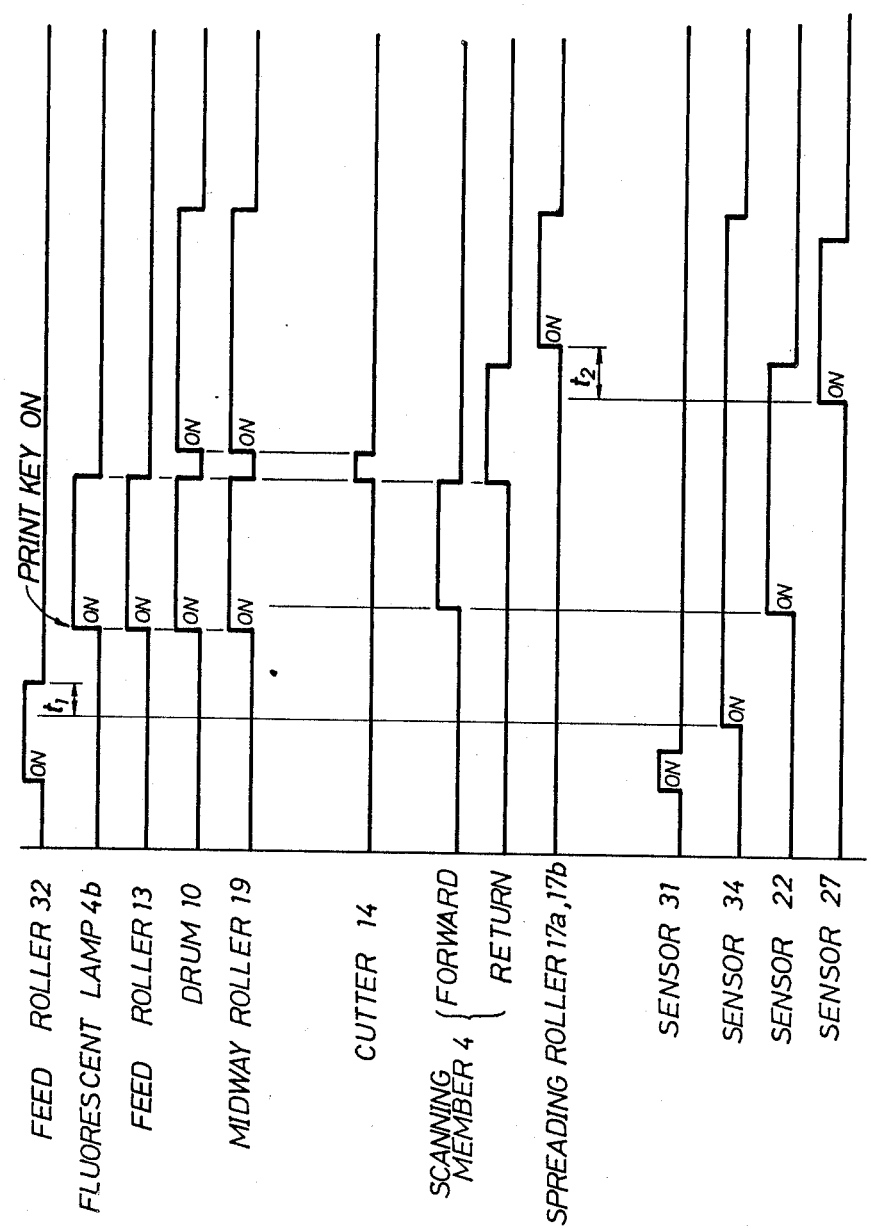

IMAGE REPRODUCING DEVICE AND TRANSFER SHEET USED IN THE DEVICE

BACKGROUND OF THE INVENTION

1. Field of the Invention

The present invention relates to an image reproducing device using a peel-apart type film and a transfer sheet used in such a device.

2. Discussion of Background

A peel-apart type film comprises a photosensitive sheet on which latent images are formed by exposure and a transfer sheet for receiving the developed images after development, which are developed in close contact with each other and separated into the photosensitive sheet and the transfer sheet after development. There has been known a photographing device using such peel-apart type films in which a great amount of photosensitive sheets and transfer sheets are prepared separately and a transfer sheet is brought into close contact with a photosensitive sheet after the exposure of the photosensitive sheet and then put to development (Japanese Laid-Open Publication Nos. Sho 61-138933 through Sho 61-138935). Such a conventional device, however, brings about a problem that bow or curl occurs in the photosensitive sheet upon exposure. That is, since the photosensitive sheet composed of a thin film base is introduced to the exposure position and the entire surface thereof is similtaneously exposed, it is difficult to keep the flatness of the exposed surface. In a case where the size of the photosensitive sheet, i.e. the size of an image to be reproduced, is small, such bow and curl give no substantial problems. However, in a case where the size of the photosensitive sheet is large, the bow and curl tend to occur readily upon exposure, thereby providing a significant problem in view of the formation of a clear reproduced image.

SUMMARY OF THE INVENTION

It is, accordingly, an object of the present invention to provide an image reproducing device using a peel-apart type film and capable of forming a clear reproduced image of a large size.

Another object of the present invention is to provide an image reproducing device of a simplified structure.

A further object of the present invention is to provide an image reproducing device capable of effectively preventing external light from intruding through the insertion portion of the transfer sheet to the inside of the device.

A still further object of the present invention is to provide an image reproducing device capable of conducting optimum development which anyone can use.

A yet further object of the present invention is to provide a transfer sheet of a reduced sheet thickness in which the transfer portion can be formed with a transparent sheet.

The foregoing object of the present invention can be attained by an image reproducing device for reproducing an image of an original by using photosensitive material and transfer material for receiving an image formed on the photosensitive material. The device includes the use of a scanner for optically scanning the original in order to produce a continuous optical signal representing an image of the original. A photosensitive film material is supplied and exposed in accordance with the continuous optical signal fed from the scanner during movements. A developer device superposes the exposed photosensitive film material on the transfer material and a developer material is spread between the superposed photosensitive film material and the transfer material.

The exposure structure includes a structure for moving the photosensitive film material which is exposed in synchronization with scanning.

The scanner includes a photoreceiver having a slit extended laterally in a predetermined scanning direction for optically receiving a partial image of the original through the slit. The photoreceiver is scanned in the predetermined scanning direction to produce a continuous optical signal representing a whole image of the original.

The supply devices preferably supplies for supplying a continuous photosensitive film to the exposure structure which preferably uses a cutter which cuts the continuous photosensitive film from the supply device into a predetermined length.

If the photosensitive film is cut after exposure, the cutter preferably cuts the continuous photosensitive film such that the length from a rear end of an area exposed by the exposure means and to a rear end of the cut photosensitive film is equal to or shorter than the length from a rear end of an image forming region of the transfer material to a rear end of the transfer material.

The transfer material may be a transfer sheet with a predetermined length, and the cutter desirably include cutting continuous photosensitive film from the supply means into a length equal to the predetermined length of the transfer sheet.

The continuous photosensitive film may be contained in a light-screening container, and it is desired that the cutting be so that the continuous photosensitive film contained in and protruded from the container is cut such that the length of a protruded portion of the continuous photosensitive film protruded outside from the container after cutting is equal to or shorter than the length from a front end of the transfer material to a front end of the image forming region thereof.

It is preferred that the exposure structure include a device for keeping an exposed region of the photosensitive film flat. This keeping device is desired to use a tensioner for exerting force on the photosensitive film to be stretched. This tensioner can be formed by a plurality of rolling means for exerting force on the photosensitive film by rotating each roller at different circumferential speeds.

The developing device preferably has a pair of spreading rollers for spreading a developer material between a superposed photosensitive film material and a transfer material, with a pair of the spreading rollers starting rotation when or after both of the photosensitive film material and the transfer material strike against the spreading rollers. Thus, the front ends of the photosensitive material and the transfer material are aligned.

The developing device may include a pair of spreading rollers for spreading a developer between the superposed photosensitive film material and transfer material, a pair of the spreading rollers starting rotation before the photosensitive film material strikes against the spreading rollers.

The image reproducing device preferably comprises an insertion opening for inserting the transfer material from the outside and a light-screened conveyance path for conveying the transfer material from the insertion opening to the developing means in order to be superposed with the exposed photosensitive film material. The conveyance path is bent at least one time.

It is desirable that the light screened conveyance path is bent upwardly or downwardly along a direction of the conveyance at least one time. The light screened conveyance path may preferably have an inner surface and a light screening for material with a long fiber length attached at least to a portion on the inner surface.

The image reproducing device desirably includes a temperature detector for detecting the atmospheric temperature, a calculator for calculating a desired development time in accordance with the atmospheric temperature detected by the temperature detection means, a start detector for detecting a time to start the developing operation of the superposed photosensitive film material and the transfer material as well as a monitor for monitoring whether the development time calculated by the calculator has been elapsed from the start time of the developing operation which start time is detected by the start detector. The results of the monitoring are output.

It is preferred that the calculator include the calculating of a desired development time in accordance with the atmospheric temperature detected by the temperature detector and with the type of transfer material.

The foregoing object can be attained according to the present invention by a transfer sheet for forming an image of an original to be reproduced by receiving an image of the original formed on a photosensitive material. The transfer sheet utilizes a transfer member having a first surface for receiving the developed image and a second surface which is in opposition to the first surface. Also included is a light-screening sheet detachably fitted on the second surface of the transfer member.

The transfer sheet preferably uses a developer sealing member for containing developer used for the development, and the light-screening sheet desirably has an extended portion which is extended from a front end of the transfer member. The developer sealing member is fitted on the extended portion of the transfer member.

On the light-screening sheet, a serial number may be preferably described.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 8 is a perspective view for one embodiment of the transfer sheet used in the device shown in FIG. 1;

FIG. 9 is an explanatory view for the cutting side of the photosensitive sheet;

FIG. 10 is a side elevational cross sectional view of another embodiment of the transfer sheet;

FIG. 11 is a side elevational cross sectional view of a further embodiment of the transfer sheet;

FIG. 16 is an explanatory view illustrating a RAM map of the control circuit shown in FIG. 12;

FIG. 17 is an explanatory view illustrating an I/O timing memory code for the control circuit shown in FIG. 12;

FIG. 18 is an explanatory view illustrating the content of the I/O code for the control circuit shown in FIG. 12;

FIG. 19 is a time chart illustrating the operation sequence of the device shown in FIG. 1;

FIG. 25 is a transversal cross sectional view schematically showing an entire copy device of another embodiment according to the present invention;

FIG. 26 is a time chart showing the operation sequence of the device shown in FIG. 25.

DESCRIPTION OF THE PREFERRED EMBODIMENTS

Figure 1:
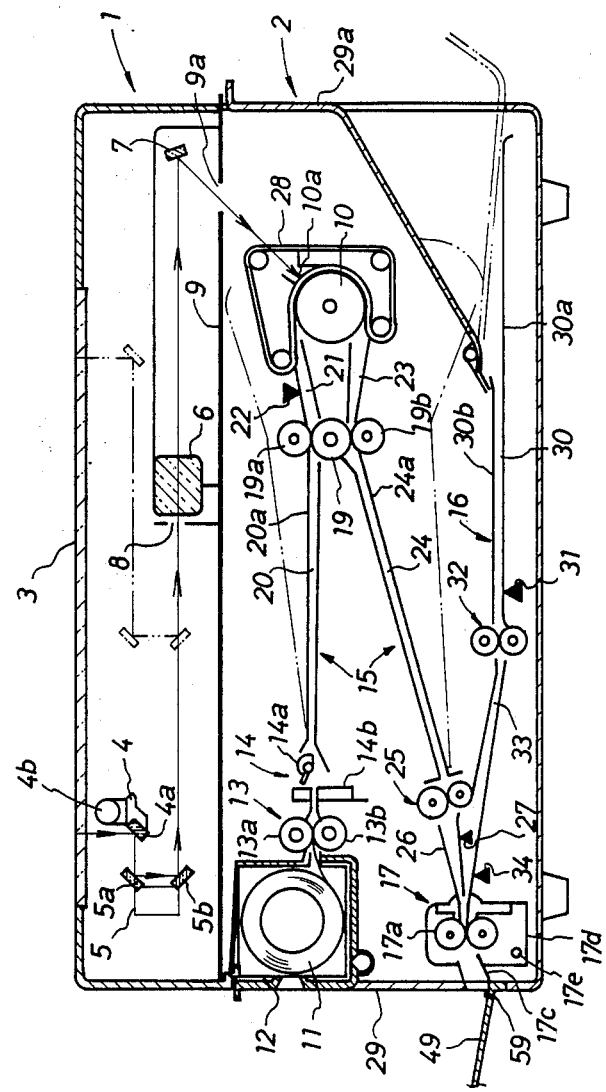
FIG. 1 is a transversal cross sectional view schematically showing the entire copying device as one embodiment according to the present invention.

The present invention will be described by way of preferred embodiments while referring to the drawings.

FIG. 1 schematically shows a copying device using a peel-apart type film as an embodiment according to the present invention. The copying device mainly comprises an optical system 1 and a conveying system 2. The optical system 1 mainly comprises a transparent contact glass 3 on which an original document (not illustrated) is placed such that the surface to be copied is in close contact therewith. The optical system also includes a first scanning member 4 having a first mirror 4a and a light source 4b, a second scanning member 5 having a second mirror 5a and a third mirror 5b, a fixed lens 6, and a fixed fourth mirror 7. The light source 4b, the first mirror 4a, the second mirror 5a, the third mirror 5b, the lens 6 and the fourth mirror 7 are each extended in a direction parallel with the contract glass 3 and perpendicular to the scanning direction of the first and the second scanning members 4 and 5 (right-to-left or vice versa in FIG. 1). The light source 4b comprises, for example, a linear light source such as a fluorescent lamp. For reproducing a satisfactory color, it is desirable to use a light source of a high color rendering property as the light source 4b. The light from the linear light source 4b illuminates the surface of an original document to be copied which is placed on the contact glass 3. The reflected light from the original is sent by way of the optical path comprising the first mirror 4a, the second mirror 5a, the third mirror 5b, the lens 6 and the fourth mirror 7 onto an exposure drum 10 in the conveying system 2 and then projected in a lateral strip-like shape through the exposure position 10a of the exposure drum 10. The original document is scanned when the first scanning member 4 having the light source 4b operates as described above. The second scanning member 5 moves in the same direction as the first scanning member 4, but at one-half the speed of the member 4. Accordingly, the length of the optical path from the surface of the original document to the exposure position 10a of the exposure drum 10 is always kept constant.

A first slit 8 is disposed in the optical path in front of the lens 6. The first slit 8 is shaped to provide a uniform exposure in the lateral direction at the exposure position 10a. That is, the first slit 8 is shaped such that its middle portion is narrow and both ends are broad. The reason for this shape is that the brightness of the fluorescent lamp used as the linear light source 4b usually has such a distribution that the light intensity of the fluorescent lamp is greater at the central portion and less at both ends. Further, the attenuation of light passing through the lens is small at the central portion and greater at the periphery.

A second slit 9a is disposed in the optical path after the fourth mirror 7. The second slit 9a is formed at the bottom plate 9 of the optical system 1 and is set to the minimum required gap for keeping the flare light as low as possible. Accordingly, the amount of exposure at the exposure position 10a is determined by the combination of the scanning speed of the first scanning member 4 and the light intensity of the light source 4b. As has been apparent from the foregoing explanation, the optical system 1 functions to scan the surface of the original document under irradiation of light and focusing an image at the surface of the original document onto the exposure drum 10. In other words, the optical system 1 optically scans the surface of the original document to produce a continuous optical signal which represents a whole image of the original document. This continuous optical signal is fed to the exposure position 10a of the exposure drum 10.

The structure of the conveying system 2 will now be described in more detail. The conveying system 2 comprises a film container 12 housing a photosensitive film 11 wound into a roll, a delivery section 13 for moving the photosensitive film 11, a cutter section 14 for cutting the delivered photosensitive film, a conveying section 15 for transporting the photosensitive film cut into a sheet-like shape (hereinafter simply referred to as the photo-sensitive sheet), the exposure drum 10, a conveying section 16 for transporting a transfer sheet which is to receive an image from the exposed photosensitive sheet, and a developing section 17 where development occurs while bringing the photosensitive sheet and the transfer sheet in close contact.

The film container 12 is a container impervious to external light, in which the photosensitive film 11 with the same width as the image receiving sheet is contained in a roll.

Figure 2:
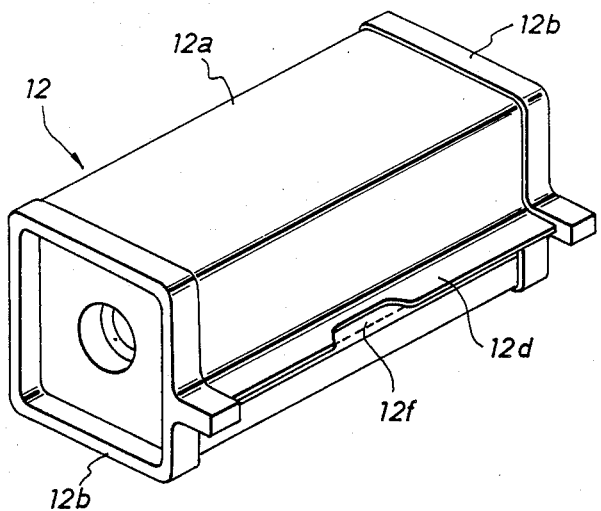
FIG. 2 is a perspective view illustrating one embodiment of a film container in the device shown in FIG. 1.
Figure 3:
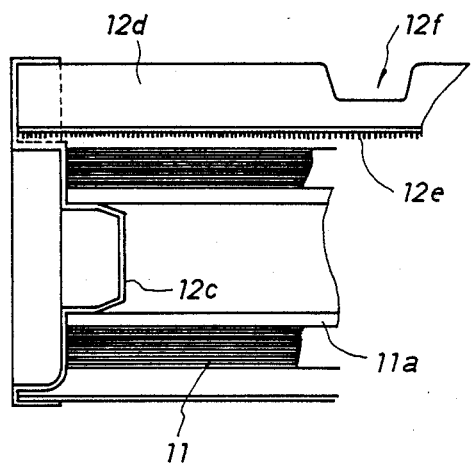
FIG. 3 is a cross sectional view showing a portion of the film container of FIG. 2.

FIG. 2 is a perspective view illustrating one embodiment of the film container 12 and FIG. 3 is a cross sectional view for a portion of the film container 12 in FIG. 2. As shown in both the figures, the film container 12 is chiefly formed of an opaque sheet material 12a with end members 12b disposed on the both sides thereof.

Figure 4:
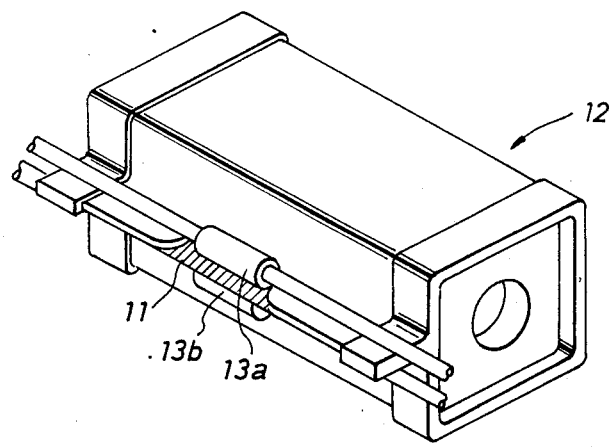
FIG. 4 is a perspective view illustrating a relationship between the film container shown in FIG. 2 and pull-out rollers.

The sheet material 12a is formed, for example, of thick, opaque paper or plastic sheet which may have aluminum foil secured thereto. Each end member 12b is formed, for example, of molded plastics. The main body of the film container 12 is constructed by inserting a portion of the previously bent sheet material 12a into grooves (not illustrated) formed in the end members 12b. As shown in FIG. 3, the end member 12b is provided with a boss 12c which fits inside the core 11a of film roll 11 for rotatably supporting the photosensitive film roll 11. The film guide portion of 12d for guiding the photosensitive film 11 externally protrudes out of the main body of the film container 12. A velvet material 12e of long fiber length is secured over the entire length of the interior of the film guide portion 12d, so that external light may not enter into the film container 12. A label may be appended to the outside of the film container 12 so that the kind of the film it contains can be observed visually. The film container 12 is made detachable from the copying device. It is possible to recognize the kind of the photosensitive film loaded in the copying device by observing the label from the outside of the copying device. The film guide portion 12d is formed with a notch 12f. The photosensitive film 11 is directed to the film guide portion 12d and the front end thereof is situated at a portion of the notch 12f. As shown in FIG. 4, when the film container 12 is mounted to the copying device, the feed rollers 13a and 13b of the delivery section 13 can grip the photosensitive film 11 at the notch 12f.

Figure 5:
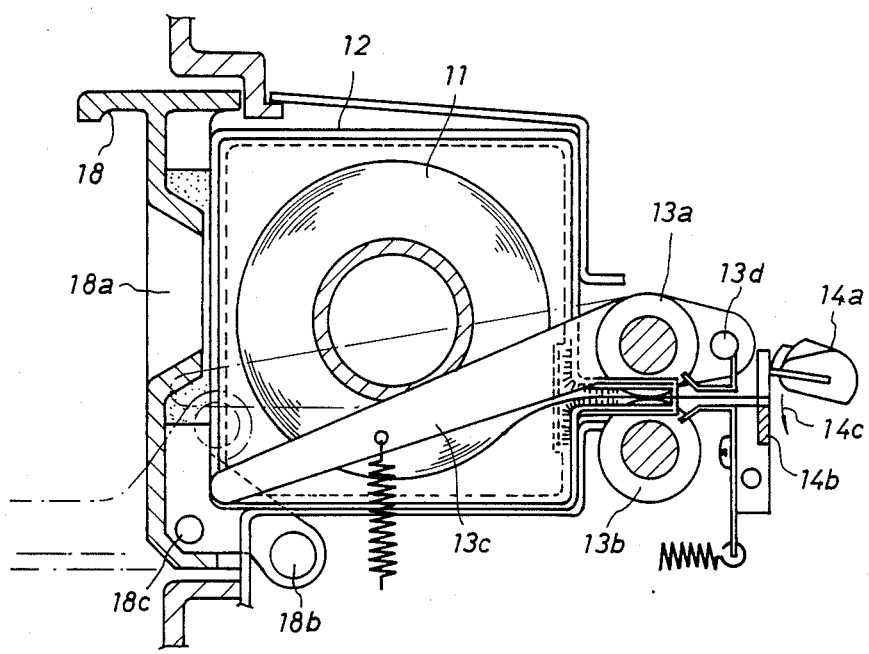
FIG. 5 is a cross sectional view showing details of a film container, a photosensitive film delivery portion and a cutter portion.

FIG. 5 shows more detail of the film container 12, including the mounting portion thereof, the delivery section 13 and the film cutter section 14. As shown in the figure, a window 18a is positioned in the ON-OFF door 18 for reading the label on the film container 12. A pin 18b is also secured to the ON-OFF door 18 so that when the ON-OFF door 18 rotates around a support shaft 18c (as shown by the dotted lines) the pin 18b lifts a lever 13c of the delivery section 13. The lever 13c is connected with the feed roller 13a such that it is rotated around a support shaft 13d as the pin 18b is rotated to the position shown by the dotted lines. When the lever 13c is thus rotated, the feed roller 13a, serving as a press or tension roller, separates from feed roller 13b which serves as the driving roller. This action frees the photosensitive film 11. Accordingly, the film container 12 can freely be attached to, and detached from, its mounting portion in this state. As described above, if the top end of the photosensitive film 11 has been pulled-out to a position aligning with the top end of the film guide portion 12d of the film container 12, the photosensitive film 11 can be positively gripped between the feed rollers 13a and 13b. Accordingly, with the foregoing construction of this embodiment, excessive loss of photosensitive film 11 during mounting of the film container 12 can be avoided. Then, an auto-loading operatation is possible for automatically sending the leading edge of the film between the feed rollers 13a and 13b by merely placing the film container 12 in the mounting portion. When the film container 12 is detached from the copying device for exchanging the photosensitive film 11 with that of a different type, the portion of the photosensitive film pulled-out of the container, that is, the portion of the film in the notch 12f of the film container 12 to the cutting position of the cutter section 14 is exposed by external light and cannot be used. Accordingly, it is desirable that the length from the notch 12f to the cutting position of the cutter section 14 be as short as possible. In this embodiment, the exposed length of the film is set to be less than the length of a region at the front end of the transfer sheet in which images cannot be formed. With this setting, the lost of photosensitive film is minimized.

The cutter section 14 comprises a rotary blade 14a and a fixed blade 14b, with the rotary blade 14a rotating as shown by the arrow 14c in FIG. 5 to cut the photosensitive film. The timing for cutting the photosensitive film is obtained by a signal from a control circuit illustrated in FIG. 12.

The conveying section 15 includes a midway roller 19, press rollers 19a and 19b opposed to and adjacent to the midway roller 19, a guide path 20 for guiding the photosensitive film sent out by the feed rollers 13a and 13b to the midway roller 19, a guide path 21 for guiding the photosensitive film from the midway roller 19 to the exposure drum 10, and a conventional sensor 22 disposed at the midpoint of the guide path 21. The sensor 22 comprises, for example, a photosensor such as a photointerruptor, microswitch, etc. for detecting the leading edge of the photosensitive film. The output signal from the sensor 22 is sent to the control circuit. The conveying section 15 further includes a guide path 23 for guiding the photosensitive film or photosensitive sheet from the drum 10 to the midway roller 19, a guide path 24 for guiding the photosensitive sheet from the midway roller 19 to an exit roller 25, a guide path 26 for guiding the photosensitive sheet from the exit roller 25 to the developing section 17 and a sensor 27 disposed at the midpoint of the guide path 26 for detecting the leading edge of the photosensitive sheet.

The sensor 27 has the same construction as that of the sensor 22, described above, and the output signal therefrom is also sent to the control circuit.

In the embodiment, as described later, when the front end or leading edge of the photosensitive film is detected by the sensor 22, a cutting instruction for the photosensitive film is sent out from the control circuit to the cutter section 14 either immediately or after a predetermined time, which causes the photosensitive film to be cut into sheets. That is, the photosensitive film is cut into photosensitive sheets before exposure. The distance between the cutting position of the cutter section 14 and the exposure position 10a on the exposure drum is set longer than the length of the image forming area of the photosensitive sheet. This eliminates the need for cutting the photosensitive film during exposure. Accordingly, there is no undesired effects caused on the exposure due to mechanical vibrations, impact shocks, etc.

The photosensitive sheet is exposed by the slit-width light by way of the optical system 1 at the exposure position 10a on the exposure drum 10, by which latent images are formed. The exposure drum 10 is rotationally driven in synchronization with the scanning speed of the optical system 1. The timing for starting the scanning of the optical system 1 is synchronized with the arrival of the leading edge of the image-forming area of the photosensitive sheet at the exposure position 10a. Belts 28 are under a predetermined tension around both ends of the exposure drum 10, respectively and the belts 28 are rotated together with the exposure drum 10. The portion at the edges of the photosensitive sheet (that is outside the image-forming area) are engaged by the belt 28 and the exposure drum 10. Accordingly, the photosensitive sheet is wrapped around the periphery of the exposure drum 10 in close contact therewith and is exposed while rotating at the speed of the exposure drum 10. The photosensitive sheet is rotated by about 180° by the exposure drum 10 and then sent by way of the guide path 23 to the midway roller 19. The circumferential speed of the exposure drum 10 is set somewhat higher than that of the midway roller 19 and an overrun mechanism comprising a one-way clutch is provided in the midway roller 19 so as to exert force on the photosensitive sheet. Accordingly, the photosensitive sheet is conveyed while being stretched along the conveying direction on the exposure drum 10 and, therefore, the longitudinal curl of the photosensitive sheet can be corrected to some extent. Further, since the photosensitive sheet is wrapped around the exposure drum 10, the lateral bow of the photosensitive sheet is also corrected. That is, since the photosensitive sheet is brought into close contact with the surface of the exposure drum 10, the optical length of the original document to the exposed surface of the photosensitive sheet can be maintained constant, while the moving speed of the photosensitive sheet can also be maintained since the device according to the present invention is adapted to expose the moving photosensitive film by scanning the original document, the exposed region is in the form of a narrow strip extending lateral with respect to the moving direction of the photosensitive film. Accordingly, it is only necessary that the exposed strip portion of the photosensitive film be kept flat and free from curls or bows. As a result, even for a thin photosensitive film of large size which readily curls or bows, the flatness of the exposed portion can be effectively maintained by the constitution as described above.

The cutter section 14, the conveying section 15 and the portion of the exposure drum 10 are screened from external light by an opaque housing 29, etc. for handling the photosensitive film.

The transfer sheet for receiving the image from the photosensitive sheet is inserted from the outside of the copying device. Since the transfer sheet has no photosensitivity, it can easily be inserted from the outside. While it is also possible to automatically supply the transfer sheet by using an automatic paper feeder or the like, the illustrated embodiment is adapted such that an operator inserts them manually one by one. In this construction, a paper feeder or the like is not necessary and the device is a low cost compact structure. The transfer sheet is inserted by the operator leftwardly (in FIG. 1) along a guide plate 30a below the guide path 30 of the conveying section 16 as described above. The conveying section 16 includes, in addition to the guide path 30, a conventional sensor 31 disposed at the midpoint of the guide path 30 for detecting the leading edge of the transfer sheet, a feed roller 32 disposed in front of the guide path 30, a guide path 33 for guiding the transfer sheet from the feed roller 32 to the developing section 17, and a conventional sensor 34 disposed at the midpoint of the guide path 33 for detecting the leading edge of the transfer sheet. Sensors 31 and 34 are of the same construction as the sensors 22 and 27 described above and output signals therefrom are sent to the control circuit.

Figure 6:
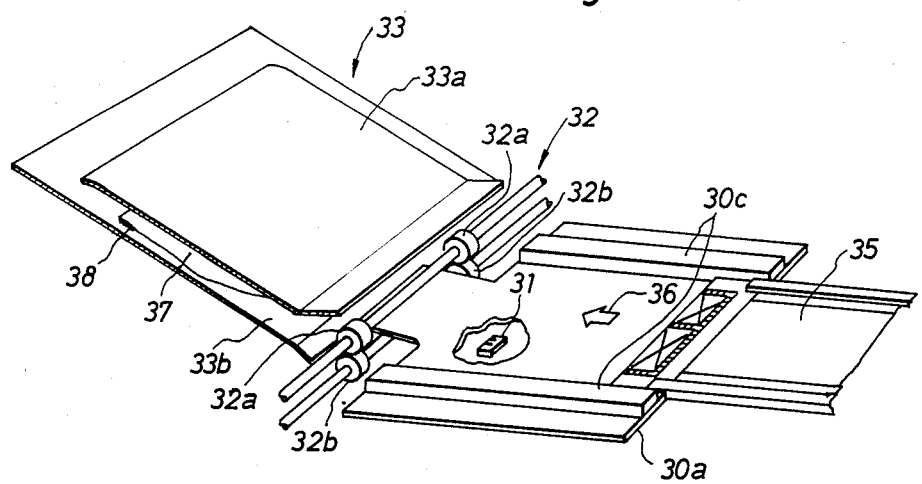
FIG. 6 is a perspective view for the transfer sheet conveying section of the device shown in FIG. 1.

FIG. 6 is a perspective view illustrating the conveying section 16 in more detail. In this figure, the upper guide plate 30b (shown in FIG. 1) of the guide path 30 is not illustrated. Side guides 30c are disposed on the lower guide plate 30a, and a transfer sheet 35 is inserted on the lower guide plate 30a between the side guides 30c in the direction of the arrow 36.

As described later, a pod having a developer sealed therein is disposed on the transfer sheet 35. The feed roller 32 has rolls 32a and 32b for gripping only the edges of the sealing portion so as not to collapse the pod on the transfer sheet 35. The conveying direction of the guide path 30 and the conveying direction of the guide path 33 are not aligned with each other, but diverge by a predetermined angle from each other. That is, as can be seen from FIGS. 1 and 6, the guide path 33 is deflected upwardly relative to the guide path 30 at the junction therebetween by a predetermined angle. This arrangement can shield external light invading from the insertion portion of the transfer sheet 35 and can prevent the exposure of the photosensitive sheet. As shown in FIG. 6, a thin sheet 37, made of an opaque reinforced polyester film for example, is appended to an upper guide plate 33a of the guide path 33 over its entire lateral width. Velvet material 38, etc. are attached to the front end of the sheet 37 and the sheet 37 is slightly urged by its own rigidity on to lower guide plate 33b. As a result, external light leaking from the transfer sheet insertion portion can be effectively shielded.

In the above-mentioned embodiment, although the guide path for the transfer sheet turns once at the midway point, it may also be turned or curved several times and the manner of turning need not always be linear, but may be curved. Furthermore, the turning direction is not restricted only to upward but it may be bent in other directions.

Figure 7:
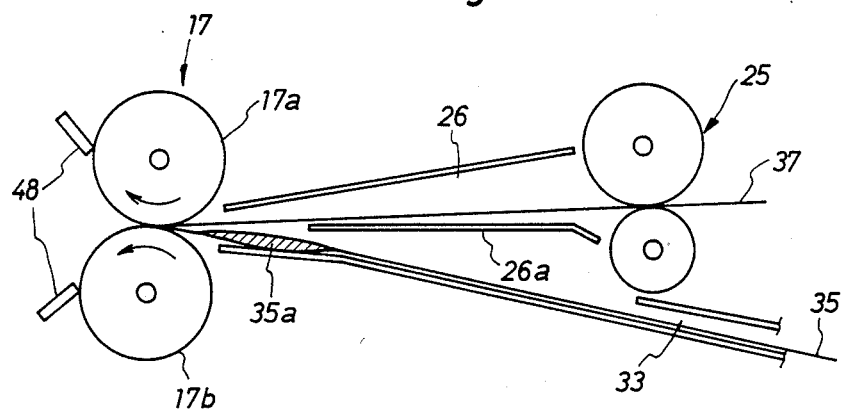
FIG. 7 is an explanatory view for aligning the photosensitive sheet and the transfer sheet.

According to this embodiment, the exposure and transfer sheets are aligned, as shown in FIG. 7, by striking the leading edge of both of them against the striking or nip portion of spreading rollers 17a and 17b in the developing section 17. The spreading rollers 17a and 17b are formed of straight rollers made of metal which engage each other under pressure. The leading edge of the transfer sheet 35 strikes against the nip portion of the spreading rollers 17a and 17b before the photosensitive sheet 37 and maintains this state. In this state, the spreading rollers 17a and 17b are stopped. Then, the photosensitive sheet 37, complete with exposure, is conveyed by the exit roller 25 along the guide path 26, passes over the transfer sheet 35 and then stops when the leading edge thereof strikes against the nip portion of the developing rollers. The alignment for both of the sheets has thus been completed. A lower guide plate 26a of the guide path 26 is disposed over the transfer sheet such that the front end of the plate may cover from the front end to the rear end of a pod 35a disposed at the front end of the transfer sheet 35. This can prevent the photosensitive sheet from diving below the pod 35a. As has been described above, since the front ends of the photosensitive sheet 37 and the transfer sheet 35 are aligned by striking against the nip portion of the spreading rollers 17a and 17b, no complicated aligning mechanisms are necessary. Accordingly, a copying device of reduced cost and compact structure is provided.

Description is now made of the transfer sheet used in the copying device according to the present invention. FIG. 8 shows one embodiment of the transfer sheet. In this figure, 39 denotes a sheet-like image-receiving material as the substrate for the transfer sheet. The surface of the image receiving material 39 and, thus, the transfer sheet (upper surface in FIG. 8) is brought into a close contact with the color-forming layer surface of the photosensitive sheet (not illustrated) upon transfer and development. A thin sheet-like bib 40 is attached by means of conventional bonding techniques etc. to the front end of the transfer sheet in the conveying direction. A pod 41 having a developer, for example liquid developer, sealed therein is appended to the bib 40. A sealed portion 41a of the pod 41 bursts when passed between the spreading rollers 17a and 17b (refer to FIGS. 1 and 7) to uniformly spread the liquid developer over the entire surface between the transfer sheet and the photosensitive sheet. The development is thus started in which the photosensitive sheet develops color within tens of second and the color former is transferred on the side of the transfer sheet. Then, when the photosensitive sheet is pealed from the transfer sheet, a positive color image can be obtained at the surface of the transfer sheet. As shown in FIG. 8, side rails 42 are disposed on the image receiving surface of the transfer sheet. These side rails 42 are releasable belt-like material attached to both sides outside of the image-forming area of the transfer sheet, along the conveying direction, so that discharged and spreaded liquid developer does not leak to the outside from the end of the transfer sheet. They are formed, for example, of conventional paper tape, or the like. The side rail 42 has a set thickness of about 0.1 mm.

Further, the viscosity of the liquid developer is high. Accordingly, the liquid developer spread between both of the side rails 42 by the spreading rollers 17a and 17b is kept to the same predetermined thickness as that of the rail. A releasable trap 43 is disposed to the rear end of the transfer sheet with respect to the conveying direction, for receiving the squeezed liquid developer and storing the same. The trap 43 can prevent excess liquid developer from being squeezed out from the rear end of the transfer sheet and contaminating the developing rollers, etc. Wedges 44, each about 2 mm in thickness, are disposed on both sides of the trap 43. These wedges 44 can widen the gap between the spreading rollers 17a and 17b during passage and permit a sufficient amount of the liquid to be stored in the trap 43. As a result, it is possible to make the length of the trap 43 shorter. Further, mask sheets 45 are releasably appended to four sides of the image receiving surface 39 of the transfer sheet. The mask sheets 45 can clearly define the boundary of the image forming area. However, the mask sheets 45 are optional.

The length of the sealing portion 41a of the pod 41 is made shorter than the distance between both of the side rails 42, 42 and between both of the wedges 44, 44. Thus, the lateral spread of the liquid developer is defined by the side rails 42 and the wedges 44. A certain distance is required for the liquid developer to spread from the sealing portion 41a of the pod 41 to both of the side rails 42 of the transfer sheet. No satisfactory image-formation, that is, image-transfer for the entire width can be obtained in this distance. Accordingly, it is desirable to form the mask 45 for that portion. With respect to the photosensitive sheet, therefore, latent images are not formed for the distance $L_F$ from the front end to the rear end of that portion of the transfer sheet. Further, there is a requirement for providing a margin at the rear end of the photosensitive sheet by the length $L_R$ for the trap 43 of the transfer sheet. Accordingly, it is necessary for the length of the photosensitive sheet, as shown in FIG. 9, that a margin for the length corresponding to the distance $L_F$ is disposed in front, while a margin for the length corresponding to the distance $L_R$ is disposed behind the length L along which latent images are formed actually. As a result, the length of the photosensitive sheet is: $L_F + L + L_R$. If the length from the notch 12f of the film container 12 to the cutting position of the cutter section 14 is made less than $L_F$ described above, there is no wasteful loss of the photosensitive film.

In a case where the photosensitive sheet and the transfer sheet are overlaid with each other and left for a necessary time for the development and transfer, it is desirable to dispose a light screening layer at the rear face of the photosensitive sheet (the surface opposite to the color-forming layer surface) and to the rear face of the transfer sheet so that it can be handled even in a bright room. As the light-screening layer for the transfer sheet, the light screening paint, etc. may be coated to the rear surface thereof. However, the thickness of the sheet is increased due to the multi-layered coating. Further, the rear face of the transfer sheet becomes black or grey to cause a peculiar feel in view of the appearance, as well as making it impossible to use a transparent image receiving member for use in a OHP (over head projector), or slide projector. In view of the above, it is desirable for such a transfer sheet that a detachable light-screening sheet 47 is appended in a tightly sealed manner to the rear face 46 of the transfer sheet as shown in FIG. 10. The light-screening sheet 47 is constituted, for example, with a light-screening paper sheet or plastic sheet. By the use of such a transfer sheet, it is no longer necessary to wait in the dark room until the developing time has elapsed but it is possible to wait for the completion of the developing period while discharging the sheet to a bright room even in a case where the transparent sheet, which itself has no light screening property, is used for constituting the image receiving member 39. This facilitates the handling of the device.

Since the transfer sheet is struck at its front end thereof against the spreading rollers 17a and 17b, buckling strength and bonding strength are required to some extent for the bib 40. However, since the bib 40 is finally stripped from the image receiving member 39, if the bonding and buckling strength is too high, it may impair the handling ability. In order to avoid this, it is preferable to extent the light screening sheet 47 to the front end of the transfer sheet and append a pod 41 to an extended portion 47a thereof as shown in FIG. 11.

In each of the embodiments as described above, it is desirable to indicate serial numbers by printing to the light screening sheet 47 for each of the transfer sheets for the convenience of successive peeling apart of a plurality of transfer sheets orderly developed, transferred and then discharged respectively after the elapse of the developing period.

As shown in FIG. 1, the developing section 17 comprises the spreading rollers 17a and 17b, a discharge guide plate 17c and a frame body 17d containing them. These spreading rollers 17a and 17b rotate in accordance with a signal from the control circuit and apply a pressure to the passing transfer sheet and the photosensitive sheet laid thereover.

Then, the pod on the transfer sheet is crushed to spread a liquid developer between both of the sheets and the latent images on the photosensitive sheet are developed. The developed images are transferred to the transfer sheet and fixed thereon. The spreading rollers 17a and 17b have a function of uniformly spreading the liquid developer at a predetermined thickness and, accordingly, it is required that the roller surfaces maintain a precise degree of roundness and be very straight across their length. In view of the above, as shown in FIG. 7, blades 48 made of resilient material are attached on the discharge side of the spreading rollers 17a and 17b. These blades 48 are always brought into contact under a constant pressure with the surface of the spreading rollers 17a and 17b and scrape out the developer flowing out of the transfer sheet and being deposited on the surfaces of the spreading rollers and 17a and 17b. This can prevent the deposited developer from being hardened to reduce the straightness of the spreading rollers 17a and 17b.

The distance between the exposure position 10a on the exposure drum 10 and the nib portion of the spreading rollers 17a and 17b is set longer than the exposed length on the photosensitive sheet. This can eliminate the requirement for starting the spreading rollers 17a and 17b during exposure. Accordingly, the photosensitive sheet and the transfer sheet are free from the undesired effects on the exposure of load fluctuation due to the starting movement of the spreading rollers 17a and 17b and mechanical impact shocks upon passage through the spreading rollers 17a and 17b.

The photosensitive sheet and the transfer sheet passed through the spreading rollers 17a and 17b are discharged into a discharge tray 49 while being in close contact with each other by the effect of the developer. When the operator releases the transfer sheet after the elapse of several tens of seconds, colored or black and white reproduced images are obtained on the transfer sheet. The timing for peeling the transfer sheet may be determined by the operator due to the measurement for the developing period from the start of the development to the peeling of the transfer sheet, but the timing measurement may be conducted by the copying device as described later.

For removing jammed sheets in a case where troubles such as conveyance failure for the photosensitive sheet or the transfer sheet should occur in the inside of the copying device, the cover 29a is made openable as shown by the dotted chain line, while the guide plate 20a forming the guide paths 20 and 21 and the guide plate 24a for forming the guide paths 23 and 24 are made rotatable as shown by the dotted chain line. For cleaning and other maintenance of the spreading rollers 17a and 17b, the developing section 17 is adapted so that the spreading rollers 17a and 17b can be exposed to the outside of the copying device by rotating a frame body 17d around the shaft 17e counterclockwise in FIG. 1 in a state where the discharge tray 49 is detached.

Figure 12:
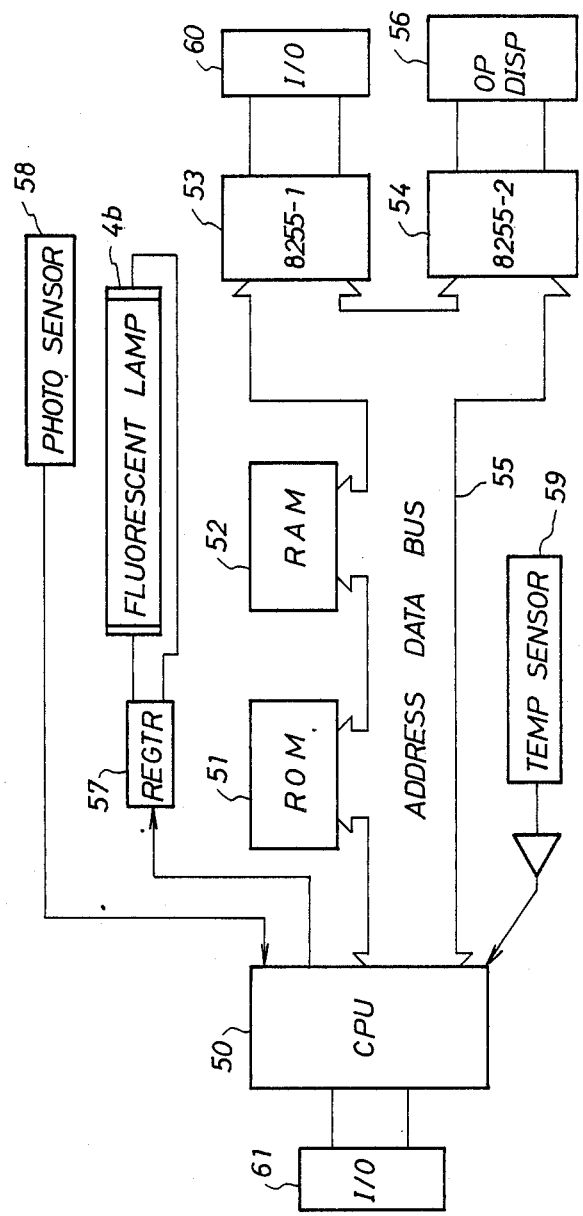
FIG. 12 is a block diagram of a control circuit for the device shown in FIG. 1.

Description is now made of the control circuit for the copying device according to the present invention. FIG. 12 is a block diagram schematically illustrating the control circuit. As shown in FIG. 12, the control circuit mainly comprises a digital computer including CPU (central processing unit) 50, ROM (read only memory) 51, RAM (random access memory), 8255 peripheral interfaces 53 and 54, and address data bus 55 for connecting them with each other to relocate data.

Figure 15:
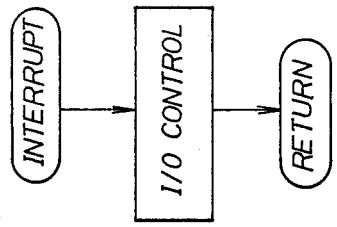
FIGS. 13, 14 and 15 are flow charts of the program of the control circuit shown in FIG. 12.
Figure 14:
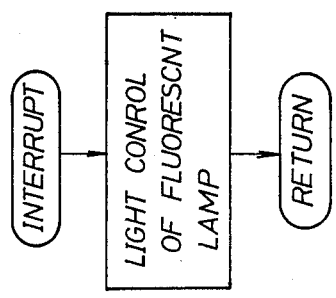
Figure 13:
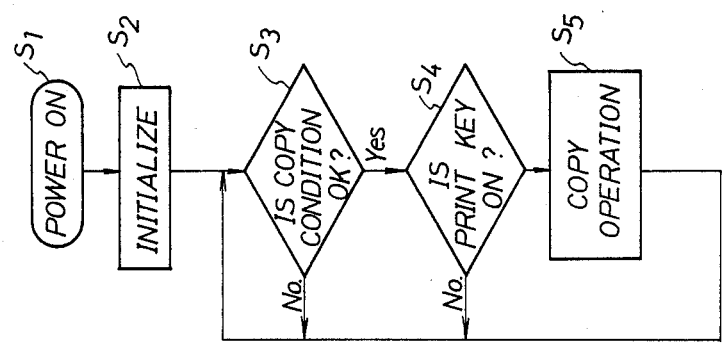

The program comprises a main routine shown in FIG. 13, and interrupt routines such as fluorescent lamp control, I/O control, etc. as shown in FIGS. 14 and 15.

In the main routine, after turning the power source to ON at step $S_1$, initialization is conducted at step $S_2$. Then, it is confirmed if copy conditions are prepared or not at step $S_3$. If the copy conditions are already prepared, the flow advances to the step $S_4$. Then, if a print key is ON, the flow advances to the step $S_5$ to enter into the copying operation. While on the other hand, if it is not ON, it returns again to the step $S_3$ again where the preparation of the copying conditions are judged.

The CPU 50 conducts the control for the entire sequence and the control for the operation and display section 56, as well as the light control for the fluorescent lamp 4b. The light control for the fluorescent lamp 4b is conducted by pulse width modulation (PWM). The light intensity of the fluorescent lamp 4b is changed by varying the duty ratio of pulses inputted to a fluorescent lamp regulator 57. In this case, the outputs from a photosensor comprising a photodiode and an operational amplifier disposed near the fluorescent lamp 4b is inputted to an A/D converter incorporated in the CPU 50, the converted value is compared with a reference value to change the pulse duty. This is done by the interrupt routine as shown in FIG. 13 which is called at every time interval during lighting of the fluorescent lamp 4b.

The operation and display section 56 connected to the CPU 50 includes a setting section for density, a display section provided with light emitting diodes (LED), and a key section provided with a print key. The operation and display section 56 is connected to the CPU 50 via a 8255 peripheral interface 54 and the address data bus 55. Therefore, transmission of display signal for the LED and entered signals from the setting section and from the key section are conducted by means of the 8255 peripheral interface 54. The density is set by varying the brightness by changing the aimed value for the light control.

Various signals from or to input/output devices (I/O), for example, sheet detection sensors, solenoids and clutch are inputted/outputted by means of the 8255 peripheral interface 53 or the ports of the CPU 50 itself. FIG. 12 shows these input/output devices by reference numerals 60, 61.

While a RAM is incorporated into the CPU 50 itself, an auxiliary RAM 52 is disposed in the outside. The RAM 52 is used for the debucking in the course of the technical development, adjustment upon production and field service after the sales.

The data stored in the RAM 52 includes measured values from the photosensor, memories for the varying time for each of input/output devices 60 occurring during the copy sequence.

Upon light control for the fluorescent lamp 4b, the output from the photosensor 58 is sampled on every predetermined period. The measured values are stacked on the RAM 52 each by four bites. As shown in the RAM map of FIG. 16, the stack region includes "256" bites components and, when data have been written into the entire area, the writing is once started from the first. In this procedures, "256" bites of new data are always stored.

Timing data of the change of the input/output devices 60 is stored by an interrupt routine as shown in FIG. 15 using a timer inside the CPU as a reference while using a counter (software counter that increments, for example, on every one msec). As shown in FIG. 17, an I/O timing code comprises four bites. I/O address and positive edge or negative edge are designated at the first bite as I/O code, I/O bits are designated at the second bite as a bit mark and the time when the change in the I/O occurs is stored by the remaining two bites as a counter value.

During the actual procedures, the copying operation is started after the initial setting such as (1) erasion by writing "0" at first to the memory area from "1100H–12FFH", (2) setting the pointer upon writing the I/O timing code to "1100H", (3) resetting a "16" bit software counter. Assuming that the film detection is turned OFF when the software counter is "1756H", peripheral interface 53, the I/O code is "02H", the bit mark is "04H", and the counter value is "1756H", so the I/O timing code is "02041756H". In FIG. 18, the I/O timing code, the binary digit of the bit mark and contents thereof are illustrated. This code is written into the address shown by the pointer and then the pointer is incremented by four. In this way, the timing for the change of the input/output devices 60 during the copying operation is stored.

The sub-routine for storing the timing during the copying operation is called together with the I/O check routine called at every 1 msec. The I/O check routine has the function of checking each of input ports, analog input ports, etc. and, for avoiding the effect of noises, when identical signals have been inputted for twice or three times, they are taken into the memory as the value for the true port value. In this case, the change of the input/output devices 60 is detected and transmitted to the I/O timing memory routine.

The operation of the copying device for this embodiment constituted and controlled as described above is to be explained referring to the time chart shown in FIG. 19.

When a transfer sheet is inserted into the guide path 30 by an operator, the sensor 31 detect this. Then, the insertion roller 32 starts rotation and the transfer sheet is conveyed passing through the guide path 33 to the spreading rollers 17a and 17b. When the sensor 34 disposed on the guide path 33 at a position before the spreading rollers 17a and 17b detects the leading edge of the transfer sheet, the insertion roller 32 stops at the elapse of a certain period of time $t_1$ after the detection. The predetermined time $t_1$ is set equal to the period required for the leading edge of the transfer sheet to strike against the nib portion of the spreading rollers 17a and 17b after the passage through the sensor 34.

As a result, the transfer sheet stops with the leading edge thereof abutting the nib portion. In this instance, the operation and display section 56 indicates a display to the effect that the copying operation is enabled. Then, when an operator pushes the print key (not illustrated) of the operation and display section 56, the copying operation is started. It is desirable to include inhibiting function such that the copying operation is not enabled even if the print key is pushed in case there is no display indicating "copy enable". This can prevent misoperation when the insertion of the transfer sheet is forgotten. When the print key is pushed, the fluorescent lamp 4b is lighted up and, at the same time, the rollers 13a and 13b start rotation and the photosensitive film is moved out.

At this instant, the midway roller 19, the exposure drum 10 and the send roller 25 start rotation simultaneously. The photosensitive film passes through the guide path 20 and the midway roller 19, enters the guide path 21 and the leading edge thereof is detected by the sensor 22. Upon detection or after the elapse of a predetermined time, all of the driving portions for the pull-out rollers 13a and 13b, the midway roller 19, the exposure drum 10 and the send roller 25 are stopped, while the rotary blade 14a of the cutter section 14 is driven to cut the photosensitive film. After cutting the photosensitive film, the midway roller 19, the exposure drum 10 and the send roller 25 are rotated again to convey the photosensitive sheet. The running, that is, the scanning of the optical system is started at such a timing that the first scanning member 4 situates to the front end of the original document at the instance when the front end of the image-forming area of the photosensitive sheet arrives at the exposure position 10a of the exposure drum 10. Namely, the first scanning member 4 starts forward movement at the above-mentioned timing. The photosensitive sheet is conveyed by way of the guide path 23, the midway roller 19, the guide path 24 and the send roller 25 to the guide path 26 after the original projection image is being exposed on the exposure drum 10. The front end of the photosensitive sheet is detected by the sensor 27 in the guide path 26. The spreading rollers 17a and 17b start rotation when or after a predetermined time $t_2$ elapsed from the detected instance. The predetermined time $t_2$ is set equal to the time required for the photosensitive sheet that the front end thereof strikes against the nib portion of the spreading rollers 17a and 17b and the sheet distorts by an appropriate amount after passing the sensor 27. Accordingly, a skew of the photosensitive sheet can be corrected and furthermore the photosensitive sheet and the transfer sheet are aligned with each other at this instance. When the spreading rollers 17a and 17b are rotated, the transfer sheet and the photosensitive sheet laid thereover are engaged and, after the spreading of the developer as described above, discharged on the discharge tray 49.

In the aforementioned embodiment, the spreading rollers 17a and 17b start rotation when or after the front end of the photosensitive sheet strikes against the nib portion thereof and the photosensitive sheet distorts by an appropriate amount. However, in the modified device according to the present invention, the spreading rollers 17a and 17b are controlled to start rotation before the photosensitive sheet strikes against the nip portion causing the transfer sheet which was already striked to start for conveyance in advance. After start, the photosensitive sheet arrives at the nib portion and is lapped over the transfer sheet. Therefore, in this case, the front end of the photosensitive sheet is not aligned with the front end of the transfer sheet, but is shifted backward by a certain length therefrom. The start time for rotation of the spreading rollers 17a and 17b, which can be defined by the elapse of time from the detected instance by the sensor 27, is determined so that the front end of the photosensitive sheet is positioned before the sealing portion of the pod of the transfer sheet. According to this modified device, the cutting length of the photosensitive sheet can be saved by the above-mentioned shifted length.

Figure 20:
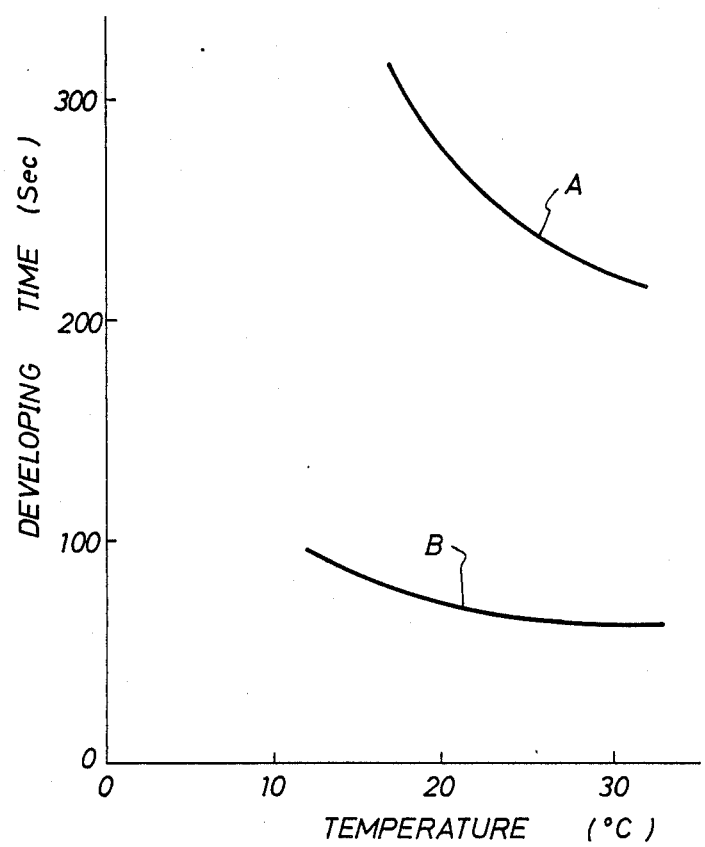
FIG. 20 is a characteristic chart showing the temperature-development time characteristics of the transfer sheet.

Now an explanation will be made in the foregoing embodiment of the mechanism capable of measuring the developing time and informing the operator of the elapse of such a time. The developing time is different depending on the kinds of photosensitive film and transfer sheet used, and the atmospheric temperature respectively. For instance, in the case of the transfer sheet, the developing time becomes different depending on the difference of material, that is, whether usual print type or OHP sheet, is used or depending on whether they are used for black and white or color use. For instance, it is about "30" sec in the case of black and white use under the ambient temperature of 20° C., and about "70" sec in the case of color print paper about "200" sec in the case of color OHP. FIG. 20 shows the relationship between the temperature and the developing time on the transfer sheet depending on the materials. In the figure, the abscissa represents the temperature while the ordinate represents the developing time, in which A shows the characteristics of the transfer sheet for use in color OHP, while B shows the characteristics of the transfer sheet as the color print paper.

Accordingly, measurement of the developing time requires calculating the time required for the development and measuring the time elapsed after the initiation of the development to confirm the equalization with the calculated time. It is necessary to input the kind of photosensitive film and transfer sheet employed, and the temperature at the periphery of the photosensitive film and the transfer sheet during development of the developing time calculation means. Further, for informing the time elapse, it is necessary to detect the time of starting the development and dispose a display means. The kind of photosensitive film and transfer sheet being used is inputted from the selection key disposed on the operation and display section 56 shown in FIG. 12. The temperature detection is carried out by a temperature sensor 59, for instance a thermistor, attached to the discharge tray 49 at a position after a discharge guide plate 17c of the developing section 17 as shown in FIG. 1.

In a case where the temperature sensor 59 is a thermistor, the voltage signal corresponding to the temperature is sent, as shown in FIG. 12, to the A/D converter incorporated in the CPU 50, converted into a digital signal and then inputted to the CPU 50. The timing for starting the development is aligned with the timing for starting the rotation of the spreading rollers 17a and 17b, which is set based on the signals from the sensor 27 as described above.

The display may be a visual display means such as a lamp or an auditory display such as a buzzer or voice synthesizer.

FIGS. 21, 22, 23 and 24 are flow charts for schematically illustrating programs that calculate the desired developing time and inform the elapse of the calculated developing time. The developing time is calculated in accordance with the program shown in FIG. 21. When the calculation for the developing time is instructed, the flow advances from the step $S_{10}$ to the steps $S_{11}$ and $S_{12}$, in which the kind of the transfer sheet used is judged. The flow advances to the step $S_{13}$, $S_{14}$ or $S_{15}$, depending on the kind of the transfer sheet. In the step $S_{13}$, $S_{14}$, or $S_{15}$, the head address of the data table containing the data for temperature-developing time of each of the kinds is stored in an HL register. Data regions are disposed for every kind of transfer sheet in the ROM 51 (FIG. 12) and the data for the developing time for each of the temperatures are previously stored in the order of the temperature in each of the data regions. For instance, the data for the developing time from 15° C. to 35° C. are stored with respect to each kind of transfer sheet. The next step $S_{16}$ is a temperature measuring routine, in which the present temperature is obtained by the output signal from the temperature sensor 59. The detected temperature is converted into a corresponding serial number of an address from the head address, and then the result is stored in the accumulator A.

In the steps $S_{17}$, $S_{18}$, $S_{19}$, the address containing the data for the desired developing time corresponding to the present temperature is determined, the desired developing time is read out, and then the value for the desired developing time is written into the target memory in the RAM 52.

Figure 22:
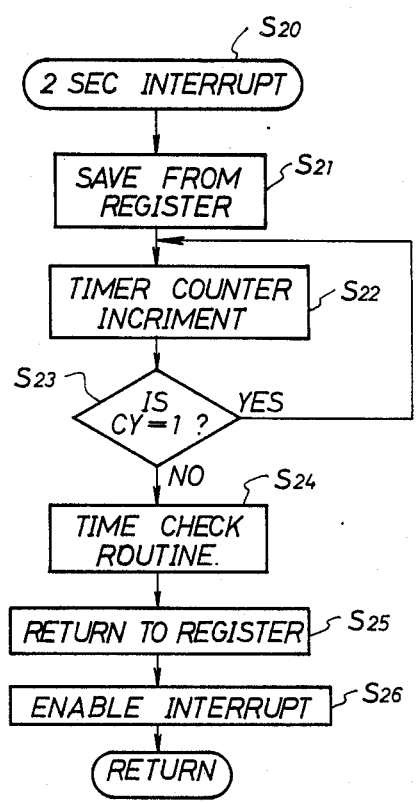
Figure 23:
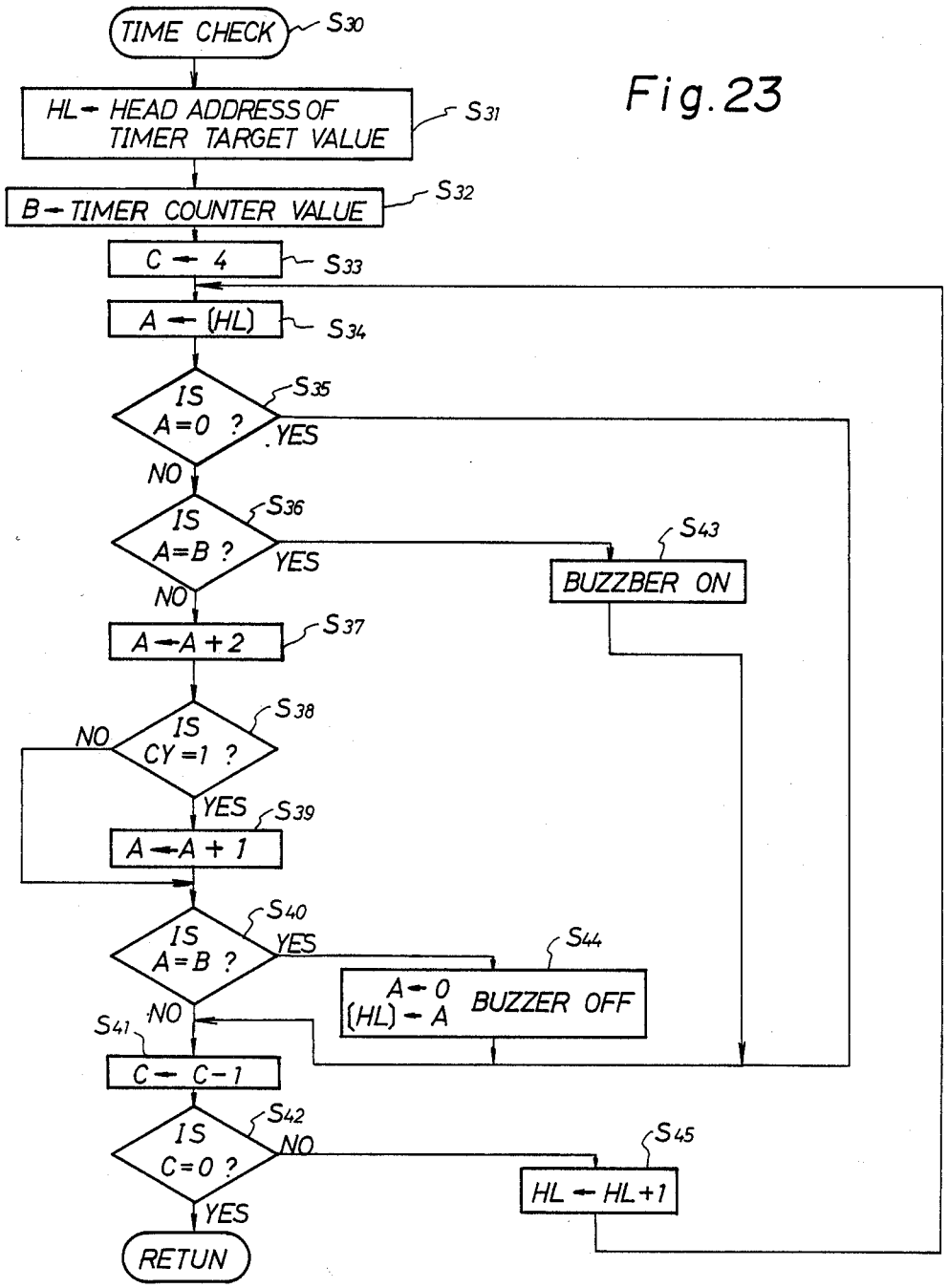

The actual developing time is measured by the interrupt routine at every two seconds as shown in FIG. 22. In this embodiment, the instruction for interrupt is generated by dividing the frequency of CPU clocks by an incorporated counter. A crystal oscillator and a frequency divider circuit may be disposed externally so as to generate clocks at a frequency of about 1–5 Hz. Interrupt occurs at every two seconds and the flow enters from the step $S_{20}$ to the processing routine. After saving the register in the step $S_{21}$, the timer counter is incremented in step $S_{22}$ and the carry CY of the timer counter is checked to judge if it is overflow or not in the step $S_{23}$. This is done for avoiding the state of the timer counter from "0" and, accordingly, the value of the timer counter is always up-dated within a range from "1" to "255" (8 bits). The next step $S_{24}$ is a time check routine, which is shown in FIG. 23. In a next step $S_{25}$, register is returned and interruption inhibition for other routines is released in the step $S_{26}$.

A discussion will not be made of the time check routine shown in FIG. 23. The time required for the development is usually longer than the time required for the copying operation for one sheet. Accordingly, there is a case where a plurality of sheets are being developed at the same time. Thus, there are several timer target values. At first, the head address of the memory containing the timer target value is stored in the HL register in the step $S_{31}$. This timer target value is prepared in the routine of FIG. 24 and is equal to the sum of the developing time value stored in the target memory of the RAM 52 in the routine shown in FIG. 21 and the timer counter value when the sheet is discharged. Then, in the next step $S_{32}$, the value of the timer counter calculated in the routine of FIG. 22 is stored in the B register. In the step $S_{33}$, the number of the target values is stored in the C register. In this case, the number of desired target values is four. In the step $S_{34}$, the content of the memory whose address is designated by the content of the HL register, that is the timer target value, is stored in the accumulator A. If the content of the timer target value is "0", it indicates that this target value is not used and, accordingly, if A=0 in the step $S_{35}$, the flow advances to the step $S_{41}$ in order to check the next target value. If A=B in the step $S_{36}$ it indicates that the time elapsed reaches the timer target value and, accordingly, the flow advances to the step $S_{43}$ to ring the buzzer and inform that the developing time has been elapsed. If it is neither A=0 nor A=B, it means that the timer value, that is, the time elapsed has not yet reached the timer target value or the buzzer has already been turned ON. If the timer target value has not yet been reached, the routine is completed by way of the following steps $S_{37}$–$S_{42}$. In a case where the buzzer has already been turned ON, the accumulator A is incremented by two in the next step $S_{37}$ and it is judged if the value is equal to B or not in the step $S_{40}$. Accordingly, when four seconds have elapsed from the start of the buzzer ringing (since the value for the timer counter is incremented each by one on every two seconds), the flow is branched to the step $S_{44}$, in which the buzzer is turned OFF and the timer target value is cleared. The steps $S_{38}$ and $S_{39}$ are disposed for preventing the content of the accumulator A from reducing to "0". In the steps $S_{41}$, $S_{42}$ and $S_{45}$, it is judged if all of the timer target values have been checked or not and, if the check has not yet been completed, the address of the HL register is incremented by one and the next timer target value is checked.

Figure 21:
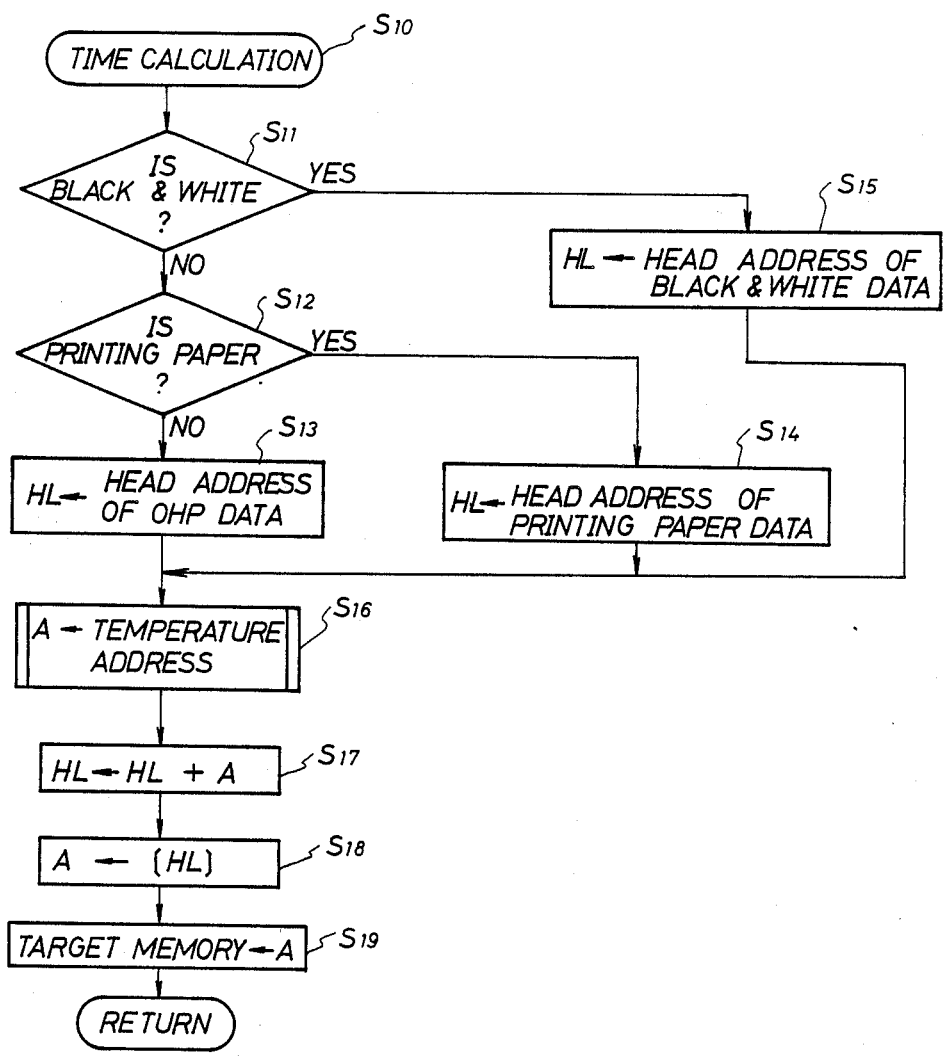
FIGS. 21, 22, 23 and 24 are flow charts of the program of the control circuit shown in FIG. 12.
Figure 24:
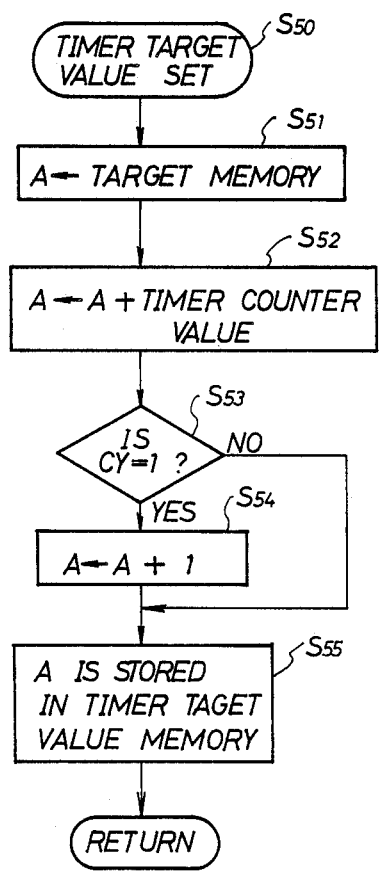

Explanation is to be made for the timer target value set routine shown in FIG. 24. The routine is called at the instance of starting the rotation of the developing rollers 17a and 17b. In the step $S_{51}$, the value for the developing time calculated in the routine of FIG. 21 is read out from the target memory. Then, the present value of the timer counter and the value of the desired developing time are added to each other in the next step $S_{52}$ to prepare the value for the accumulator A. Then, the value is written in the not yet used portion for the timer target value containing region in the memory in the step $S_{53}$. Whether the portion is already yet used or not is judged by whether or not the value stored in that portion is "0". The steps $S_{53}$ and $S_{54}$ are disposed for preventing the timer target value from reducing to "0" so as to avoid such a disadvantage that the timer target value is erroneously judged as the not-yet used portion although it is "0" due to the overflow.

In this regard, a more detailed explanation will now be made. When an operator starts the copying operation by pressing the print key, the necessary developing time is calculated as described above depending on the kind of the photosensitive film and the transfer sheet used, temperature, etc. It is assumed that the time is, for example, "180" seconds and the value of the timer counter when the sheet is discharged is "166". Since the value for the developing time stored in the target memory in this case is "90" (180/2), the timer target value is 166+90=256. However, since the calculation is conducted based on eight bits, overflow occurs as 256−256=0. If this is written as it is into the memory, it is erroneously judged as the not-yet used portion and, accordingly, the operation of adding "1" is conducted if the result of the addition exceeds "255".

In the embodiment as described above, the routine of FIG. 24 is called upon starting of the rotation of the developing rollers 17a and 17b, but it may alternatively be called by other means, for example, by the signal from a sensor disposed to the sheet discharging portion. The timing for starting the timer may also be a timing when the sensor 27 detects the front end of the photosensitive sheet or when the print key disposed to the operation display section 56 is pushed down.

As has been described above, it is possible to conduct optimum development with no failures by any person irrespective of the circumstantial temperature and the kind of the photosensitive film and the transfer sheet employed, by disposing a mechanism for calculating the developing time and informing the operation of the elapsed time.

FIG. 25 schematically shows a copying device also using a peel-apart type film as another embodiment of the present invention. This embodiment differs from the embodiment of FIG. 1 mainly in that the optical system 101 of this embodiment has a variable magnifying function for enlarging and reducing the size of the images from an original document and the exposure position for the photosensitive film is situated upstream from a drum 110 and a midway roller 119. As shown in FIG. 25, the reflection light from the original document (not illustrated) on a contact glass 3 is sent by way of an optical path including a first mirror 4e, a second mirror 5a, a third mirror 5b, a lens 106, a fourth mirror 107a, a fifth mirror 107b and a sixth mirror 70 to an exposure position 71 in a conveying system 102. The lens 106, the fourth mirror 107a and the fifth mirror 107b are driven in accordance with the magnifying or reducing ratio for the original, and thus the ratio and the optical conjugate length are adjusted. The constitution for obtaining the function of the variable ratio magnification has been well-known in the field of the copying device and the detailed explanation thereof is omitted. In this embodiment, since the exposure position 71a is disposed just after the cutter section 14, the photosensitive film pulled out from the film container 12 is exposed before cutting. Accordingly, the operation sequence for the cutter section 14, various rollers and the optical system 101 is somewhat different from that of the embodiment shown in FIG. 1.

In the embodiment shown in FIG. 25, the exposure position 71a is disposed on a flat surface of a guide plate 71. The height of the flat surface is the same as or higher than the height of the nibs of the pull out rollers 13a and 13b and of the midway roller 119. The circumferential speed of the midway roller 119 is set somewhat higher than the circumferential speed of the pull out rollers 13a and 13b and an over-run mechanism is provided in the pull out rollers 13a and 13b so as to exert force on the photosensitive sheet to be stretched. Therefore, an exposed region of the photosensitive sheet is always closely in contact with the flat surface of the guide plate 71 causing the exposed region to be always kept in flat.

According to the embodiment of FIG. 25, since the cutter section 14 is positioned in front of the exposure position 71a and the exposure is done before cutting, there remains an area in which images cannot be formed on a rear end portion of the cut photosensitive film. The length of this area corresponds to the length between the cutting position of the cutter section 14 and the exposure position 71a. However, if the cutter section 14 and the exposure position 71a are disposed so that the length from a rear end of the above area to a rear end of the cut photosensitive film is equal to or shorter than the length $L_R$ (shown in FIG. 8) from a rear end of the image forming region to a rear end of the transfer sheet, the excess loss of photosensitive film can be avoided. Further, in this embodiment, a guide path 130 and a guide path 133 in the conveying section 102 for the transfer sheet are angularly apart from each other by a predetermined angle. The guide path 133 is deviated angularly from the guide path 130 at the junction portion thereof downwardly by a predetermined angle. Other constitutions and operations of this embodiment are substantially the same as those in the embodiment of FIG. 1.

FIG. 26 is a time chart representing the operation sequence of the embodiment shown in FIG. 25. The operation of the device shown in FIG. 25 is to be explained referring to FIG. 26.

The operation from the insertion of the transfer sheet by an operator to the delivery of the photosensitive film and the detection of the front end of the photosensitive film by the sensor 22 is identical with the operation of the device shown in FIG. 1. When the front end of the photosensitive film is detected, the running, that is, the scanning of the optical system 101 is started to carry out the exposure. That is, the first scanning member 4 starts forward movement. When the first scanning member 4 moves to the forward most position, the pull-out rollers 13a and 13b, the midway roller 119 and the drum 110 are stopped and the fluorescent lamp 4b is put off. Simultaneously, the rotary blade 14a of the cutter section 14 is driven to cut the photosensitive film. The exposed and cut photosensitive sheet is turned by about 180° by the drum 110 and, thereafter, sent to the developing section 17. The subsequent operations are quite identical with those of the device shown in FIG. 1.

Many widely different embodiments of the present invention may be constructed without departing from the spirit and scope of the present invention. It should be understood that the present invention is not limited to the specific embodiments described in this specification, except as defined in the appended claims.

What is claimed as new and desired to be secured by Letters Patent of the United States is:

1. An image reproducing device for reproducing an image of an original using a photosensitive film and a transfer material for receiving an image formed on said photosensitive film, comprising:
    a scanning means for optically scanning a surface of an original, said surface being to be reproduced, in a predetermined direction, while generating sequentially light beams reflected from each of portions of said scanned surface;
    a supply means for supplying said photosensitive film;
    an exposure means for exposing said supplied photosensitive film, said exposure means comprising a pair of tension rollers and an exposure station, a pair of said tension rollers being adapted to rotate at a somewhat higher circumferential speed than a speed of said supplied photosensitive film so as to exert a tension on said supplied photosensitive film, said exposure station being situated in an image forming position of said generated light beams between said supply means and said tension rollers for exposing said supplied photosensitive film, and having a flat surface positioned at a height identical with or higher than a height of a straight line connecting a position of said photosensitive film supplied from said supply means with a nip of said tension rollers, said flat surface contacting with said supplied photosensitive film; and
    a developing means for superposing said exposed photosensitive film on said transfer material and for spreading a developer between said superposed photosensitive film and said transfer material.

2. An image reproducing device according to claim 1, wherein said scanning means comprises photoreceiving means having a slit extending laterally in said predetermined direction for continuously receiving said light beams.

3. An image reproducing device according to claim 1, wherein said supply means comprises means for supplying a continuous photosensitive film to said tension rollers.

4. An image reproducing device according to claim 3, wherein said supply means comprises cutting means cutting said continuous photosensitive film from said means for supplying a continuous photosensitive film into a predetermined length.

5. An image reproducing device according to claim 4, wherein said cutting means comprises means for cutting said continuous photosensitive film from said supply means into a predetermined length subsequent to said exposure of said continuous photosensitive film.

6. An image reproducing device according to claim 5, wherein said transfer material has an image forming region, and said cutting means comprises means for cutting said continuous photosensitive film in such a manner that a length from a rear end of an area exposed by said exposure means to a rear end of said cut photosensitive film is equal to or shorter than a length from a rear end of said image forming region to a rear end of said transfer material.

7. An image reproducing device according to claim 4, wherein said transfer material consists of a transfer sheet having a predetermined length, and said cutting means comprises means for cutting said continuous photosensitive film from said supply means into a length equal to said predetermined length of said transfer sheet.

8. An image reproducing device according to claim 7, wherein said transfer material has an image forming region, said photosensitive film has an exposing region, and a length from a front end of said transfer material to a front end of said image forming region is equal to a length from a front end of said photosensitive film to a front end of said exposing region.

9. An image reproducing device according to claim 4, wherein said means for supplying a continuous photosensitive film comprises a container shielded from light with said continuous photosensitive film contained in said container.

10. An image reproducing device according to claim 9, wherein said transfer material has an image forming region, said cutting means comprises means for cutting said continuous photosensitive film contained in and protruded from said container in such a manner that a length of a protruded portion of said continuous photosensitive film protruded outside from said container after cutting is equal to or shorter than a length from a front end of said transfer material to a front end of said image forming region.

11. An image reproducing device according to claim 3, wherein said means for supplying a continuous photosensitive film comprises a container shielded from light with said continuous photosensitive film contained in said container in a rolled form.

12. An image reproducing device according to claim 1, wherein said developing means comprises alignment means for aligning front ends of said photosensitive film and said transfer material.

13. An image reproducing device according to claim 12, wherein said developing means comprises a pair of spreading rollers for spreading a developer between said superposed photosensitive film and said transfer material, and said alignment means aligns said front ends of said photosensitive film and said transfer material by striking said front ends of said photosensitive film and said transfer material against a nip portion of said spreading rollers.

14. An image reproducing device according to claim 1, wherein said developing means is provided with a pair of spreading rollers for spreading a developer between said superposed photosensitive film and said transfer material, a pair of said spreading rollers starting rotation at a time subsequent to a time when said photosensitive film and said transfer material strike against said spreading rollers.

15. An image reproducing device according to claim 14, wherein said transfer material comprises a transfer member and a developer sealing member, a front end portion of said developer sealing member is fixed to a front end portion of said transfer member and a rear end of said developer sealing member is free, said exposure means comprises a guide member for superposing said exposed photosensitive film on said transfer material, said guide member guiding said exposed photosensitive film so that said exposed photosensitive film runs over said developer sealing member of said transfer material to come into contact with said transfer material.

16. An image reproducing device according to claim 1, wherein said developing means is provided with a pair of spreading rollers for spreading a developer between said superposed photosensitive film and said transfer material, a pair of said spreading rollers starting rotation before said photosensitive film strikes against said spreading rollers.

17. An image reproducing device according to claim 1, wherein said device further comprises:

an insertion opening for inserting said transfer material from outside said image reproducing device; and a light-screened conveyance path for conveying said transfer material from said insertion opening to said developing means so as to be superposed with said exposed photosensitive film, said conveyance path being bent at least one time.

18. An image reproducing device according to claim 17, wherein said light-screened conveyance path is bent upwardly along a direction of said conveyance at least one time.

19. An image reproducing device according to claim 17, wherein said light-screened conveyance path is bent downwardly along a direction of said conveyance at least one time.

20. An image reproducing device according to claim 17, wherein said light-screened conveyance path has an inner surface and a light-screening fur material with a long fiber length attached at least to a portion of said inner surface.

21. An image reproducing device according to claim 1, wherein said device further comprises:

a temperature detection means for detecting an atmospheric temperature;

a calculation means for calculating a desired development time in accordance with said atmospheric temperature detected by said temperature detection means;

a start detection means for detecting a time to start a developing operation of said superposed photosensitive film and said transfer material; and a monitor means for monitoring whether said development time calculated by said calculation means has elapsed from said start time of said developing operation, which start time is detected by said start detection means, and for outputting a signal indicating results of said monitoring.

22. An image reproducing device according to claim 21, wherein said calculation means comprises means for calculating a desired development time in accordance with said atmospheric temperature detected by said temperature detection means and with a type of transfer material used.

23. An image reproducing device according to claim 15, wherein said guide member comprises a guide plate for separating said exposed photosensitive film from said transfer material, said guide plate being so disposed that a distance between a front end of said guide plate and a nip portion of said spreading rollers is shorter than a distance from said front end of said transfer member to said rear end of said developer sealing member of said transfer material.

24. An image reproducing device for reproducing an image of an original using a photosensitive film and a transfer material for receiving an image formed on said photosensitive film, comprising:

an exposure means for forming a latent image of said original on said photosensitive film by an exposure; and a developing means for superposing said photosensitive film exposed by said exposure means on said transfer material, said developing means being provided with a pair of spreading rollers for spreading a developer between said superposed photosensitive film and said transfer material, with front ends of said exposed photosensitive film and said transfer material being aligned by striking said front ends thereof against said spreading rollers when said spreading rollers are not rotating, said transfer material comprising a transfer member and a developer sealing member, a front end portion of said developer sealing member being fixed to a front end portion of said transfer member and a rear end of said developer sealing member being free, said exposure means comprising a guide member for superposing said exposed photosensitive film on said transfer material, said guide member guiding said exposed photosensitive film so that said exposed photosensitive film runs over said developer sealing member of said transfer material to come into contact with said transfer material.

25. An image reproducing device according to claim 24, wherein said guide member comprises a guide plate for separating said exposed photosensitive film from said transfer material, said guide plate being disposed so that a distance between a front end of said guide plate and a nip portion of said spreading rollers is shorter than a distance from said front end of said transfer member to said rear end of said developer sealing member of said transfer material.

26. An image reproducing device for reproducing an image of an original using a photosensitive film and a transfer material for receiving an image formed on said photosensitive film, comprising:
   a scanning means for optically scanning a surface of said original, said surface being to be reproduced, in a predetermined direction, while generating sequentially light beams reflected from each of portions of said scanned surface;
   a sending means for sending forth said photosensitive film;
   an exposure means for exposing said sent photosensitive film, said exposure means comprising an exposure drum, on a surface of which an image of said original is formed, said exposure drum being adapted to be rotationally driven at a speed greater than that of said sent photosensitive film so as to exert a tension on said sent photosensitive film; and
   a developing means for superposing said exposed photosensitive film on said transfer material and for spreading a developer between said superposed photosensitive film and said transfer material.

27. An image reproducing device according to claim 26, wherein said scanning means comprises a photoreceiving means having a slit extending laterally in said predetermined direction for continuously receiving said light beams.

28. An image reproducing device according to claim 26, wherein said sending means comprises means for supplying a continuous photosensitive film to said exposure means.

29. An image reproducing device according to claim 28, wherein said sending means comprises a cutting means for cutting said continuous photosensitive film from said means for supplying a continuous photosensitive film into a predetermined length.

30. An image reproducing device according to claim 29, wherein said cutting means comprises means for cutting said supplied continuous photosensitive film into a predetermined length prior to said exposure of said photosensitive film.

31. An image reproducing device according to claim 29, wherein said cutting means comprises means for cutting said supplied continuous photosensitive film into a predetermined length subsequent to said exposure of said continuous photosensitive film.

32. An image reproducing device according to claim 31, wherein said transfer material has an image forming region, and said cutting means comprises means for cutting said supplied continuous photosensitive film in such a manner that a length from a rear end of an area exposed by said exposure means to a rear end of said cut photosensitive film is equal to or shorter than a length from a rear end of said image forming region to a rear end of said transfer material.

33. An image reproducing device according to claim 29, wherein said transfer material consists of a transfer sheet having a predetermined length, and said cutting means comprises means for cutting said supplied continuous photosensitive film into a length equal to said predetermined length of said transfer sheet.

34. An image reproducing device according to claim 33, wherein said transfer material has an image forming region, said photosensitive film has an exposing region, and a length from a front end of said transfer material to a front end of said image forming region is equal to a length from a front end of said photosensitive film to a front end of said exposing region.

35. An image reproducing device according to claim 29, wherein said means for supplying a continuous photosensitive film comprises a container shielded from light with said continuous photosensitive film contained in said container.

36. An image reproducing device according to claim 35, wherein said transfer material has an image forming region, and said cutting means comprises means for cutting said continuous photosensitive film contained in and protruded from said container in such a manner that a length of a protruded portion of said continuous photosensitive film protruded outside from said container after cutting is equal to or shorter than a length from a front end of said transfer material to a front end of said image forming region.

37. An image reproducing device according to claim 28, wherein said means for supplying a continuous photosensitive film comprises a container shielded from light with said continuous photosensitive film contained in said container in a rolled form.

38. An image reproducing device according to claim 26, wherein said developing means comprises an alignment means for aligning front ends of said photosensitive film and said transfer material.

39. An image reproducing device according to claim 38, wherein said developing means comprises a pair of spreading rollers for spreading a developer between said superposed photosensitive film and said transfer material, and said alignment means aligns said front ends of said photosensitive film and said transfer material by striking said front ends of said photosensitive film and said transfer material against a nip portion of said spreading rollers.

40. An image reproducing device according to claim 26, wherein said developing means is provided with a pair of spreading rollers for spreading a developer between said superposed photosensitive film and said transfer material, a pair of said spreading rollers starting rotation at a time subsequent to a time when said photosensitive film and said transfer material strike against said spreading rollers.

41. An image reproducing device according to claim 40, wherein said transfer material comprises a transfer member and a developer sealing member, a front end portion of said developer sealing member is fixed to a front end portion of said transfer member and a rear end of said developer sealing member is free, said exposure means comprises a guide member for superposing said exposed photosensitive film on said transfer material, said guide member guiding said exposed photosensitive film so that said exposed photosensitive film runs over said developer sealing member of said transfer material.

42. An image reproducing device according to claim 26, wherein said developing means is provided with a pair of spreading rollers for spreading a developer between said superposed photosensitive film and said transfer material, a pair of said spreading rollers starting rotation before said photosensitive film strikes against said spreading rollers.

43. An image reproducing device according to claim 26, wherein said device further comprises:
   an insertion opening for inserting said transfer material from outside said image reproducing device; and
   a light-screened conveyance path for conveying said transfer material from said insertion opening to said developing means so as to be superposed with said exposed photosensitive film, said conveyance path being bent at least one time.

44. An image reproducing device according to claim 43, wherein said light-screened conveyance path is bent upwardly along a direction of said conveyance at least one time.

45. An image reproducing device according to claim 43, wherein said light-screened conveyance path is bent downwardly along a direction of said conveyance at least one time.

46. An image reproducing device according to claim 43, wherein said light-screened conveyance path has an inner surface and a light-screening fur material with a long fiber length attached at least to a portion of said inner surface.

47. An image reproducing device according to claim 26, wherein said device further comprises:
   a temperature detection means for detecting an atmospheric temperature;
   a calculation means for calculating a desired development time in accordance with said atmospheric temperature detected by said temperature detection means;
   a start detection means for detecting a time to start a developing operation of said superposed photosensitive film and said transfer material; and
   a monitor means for monitoring whether said development time calculated by said calculation means has elapsed from a start time of said developing operation, which start time is detected by said start detection means, and for outputting a signal indicating results of said monitoring.

48. An image reproducing device according to claim 47, wherein said calculation means comprises means for calculating a desired development time in accordance with said atmospheric temperature detected by said temperature detection means and with a type of transfer material used.

49. An image reproducing device according to claim 41, wherein said guide member comprises a guide plate for separating said exposed photosensitive film from said transfer material, said guide plate being so disposed that a distance between a front end of said guide plate and a nip portion of said spreading rollers is shorter than a distance from said front end of said transfer member to said rear end of said developer sealing member of said transfer material.

* * * * *